United States Patent [19]
Wakefield et al.

[11] Patent Number: 5,779,830
[45] Date of Patent: Jul. 14, 1998

[54] FLEXIBLE TAPE APPLICATOR AND METHOD OF OPERATION

[75] Inventors: Timothy A. Wakefield, Williamsburg; David L. Clark, Hamilton; A. B. Lockstead, Cincinnati, all of Ohio

[73] Assignee: Truseal Technologies, Inc., Beachwood, Ohio

[21] Appl. No.: 547,308

[22] Filed: Oct. 24, 1995

[51] Int. Cl.[6] .................... B32B 31/00; B65H 26/00
[52] U.S. Cl. .................... 156/64; 156/107; 156/351; 156/361; 156/384; 156/543; 156/577
[58] Field of Search .................... 156/64, 107, 109, 156/350, 352, 358, 361, 543, 574, 577, 384, 351

[56] References Cited

U.S. PATENT DOCUMENTS

| | | | |
|---|---|---|---|
| 3,886,113 | 5/1975 | Uffner | 260/40 R |
| 3,981,763 | 9/1976 | Brocklehurst | 156/352 |
| 3,990,570 | 11/1976 | Mercier et al. | 198/782 |
| 4,088,522 | 5/1978 | Mercier et al. | 156/107 |
| 4,145,237 | 3/1979 | Mercier et al. | 156/107 |
| 4,328,061 | 5/1982 | Off et al. | 156/353 |
| 4,431,691 | 2/1984 | Greenlee | 428/34 |
| 4,546,723 | 10/1985 | Leopold et al. | 118/669 |
| 4,557,783 | 12/1985 | Grone et al. | 156/257 |
| 4,561,929 | 12/1985 | Lenhardt et al. | 156/522 |
| 4,568,950 | 2/1986 | Ross et al. | 346/76 PH |
| 4,620,354 | 11/1986 | Hess et al. | |
| 4,696,707 | 9/1987 | Lewis et al. | 156/64 |
| 4,756,789 | 7/1988 | Kolff | 156/391 |
| 4,781,782 | 11/1988 | Luhman et al. | 156/361 |
| 4,799,981 | 1/1989 | Stone et al. | 156/64 |
| 4,834,827 | 5/1989 | Obeda | 156/352 |
| 4,997,513 | 3/1991 | Lengen et al. | 156/523 |
| 5,013,377 | 5/1991 | Lafond | 156/109 |
| 5,045,146 | 9/1991 | Rundo | 156/391 |
| 5,072,359 | 12/1991 | Knaifel, II | 364/167.01 |
| 5,117,348 | 5/1992 | Romero et al. | 364/167.01 |
| 5,246,331 | 9/1993 | Hallahan et al. | 414/676 |
| 5,352,306 | 10/1994 | Grimshaw et al. | 156/64 |
| 5,536,342 | 7/1996 | Reis et al. | 156/64 |

FOREIGN PATENT DOCUMENTS

| | | |
|---|---|---|
| A-301983 | 7/1988 | European Pat. Off. . |
| A-2599465 | 5/1986 | France . |
| A-2636380 | 9/1988 | France . |
| U-8710842 | 8/1987 | Germany . |
| A-3818631 | 6/1988 | Germany . |

*Primary Examiner*—David A. Simmons
*Assistant Examiner*—Paul M. Rivard
*Attorney, Agent, or Firm*—Arter & Hadden LLP; S. Paige Christopher

[57] ABSTRACT

An applicator for applying a flexible tape to a planar sheet having a base, a table, a robotic arm and an applicator head. The applicator head is carried by the robotic arm and includes a cradle for receiving a spool of flexible tape. The robotic arm moves the applicator head through the Cartesian coordinate system relative to the table. A motor feeds flexible tape out from the spool, over a dancer arm through a plurality of rollers. A sensor associated with the dancer arm measures the pressure or position in a cylinder connected to the dancer arm and forwards a signal to the motor to increase the speed if the dancer arm pressure is high, and decrease the motor speed if dancer arm pressure is low. A plurality of optical sensors determine the layer of flexible tape currently being removed from the reel, and adjust the motor speed to adjust for the varying length of material removed per revolution as concentric layers of flexible tape are removed from the spool.

37 Claims, 15 Drawing Sheets

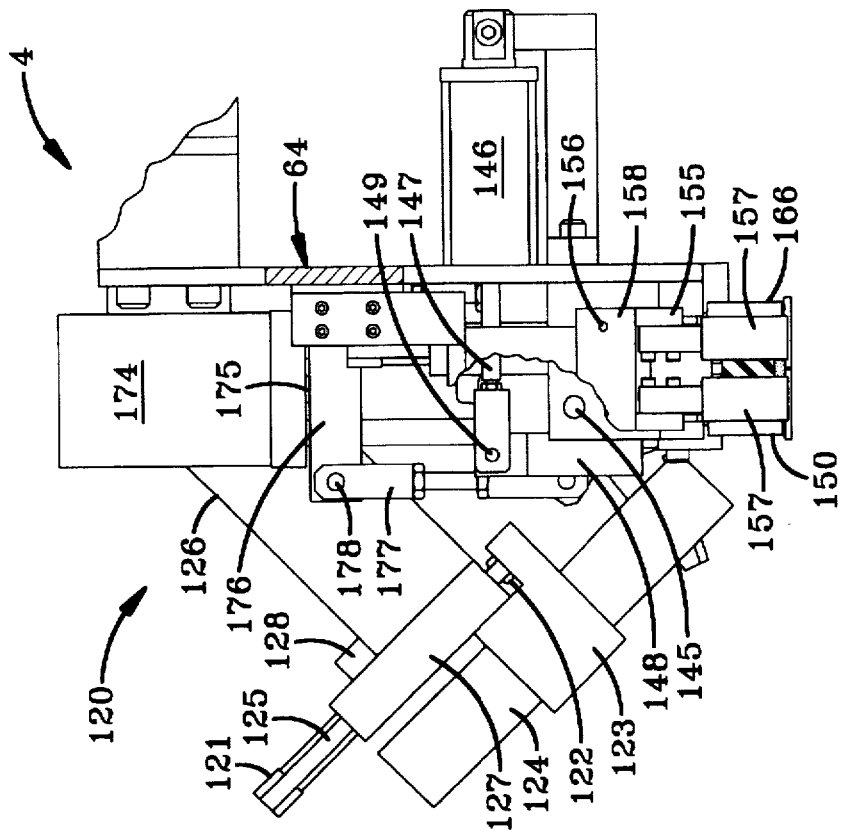
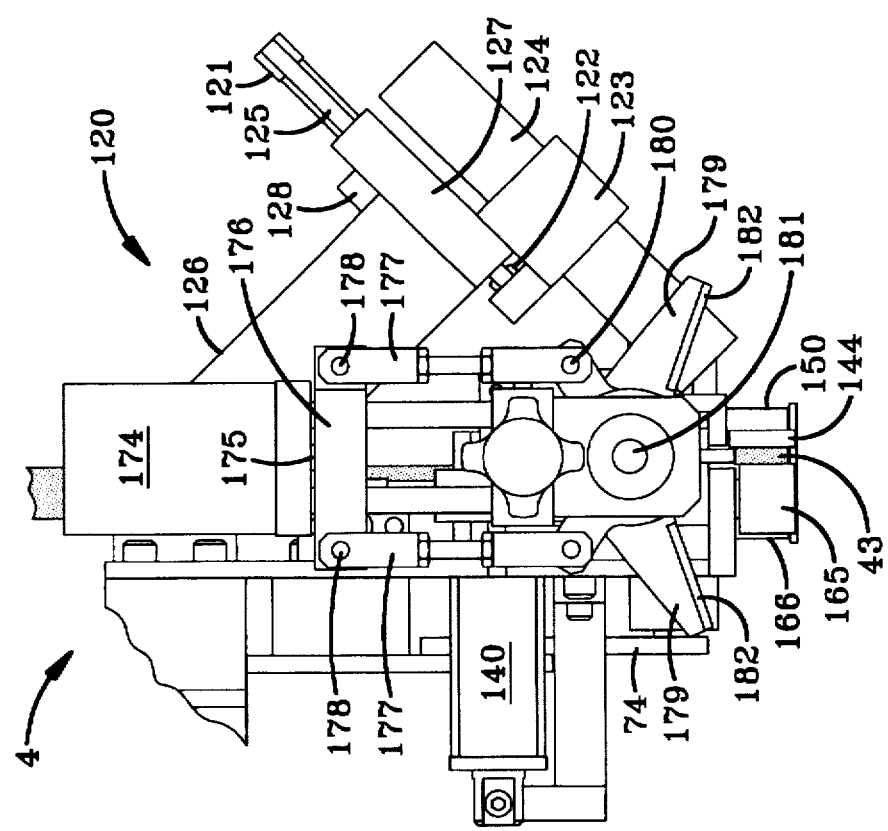

FLEXIBLE TAPE APPLICATOR AND METHOD OF OPERATION

BACKGROUND OF THE INVENTION

1. Technical Field

The invention relates generally to a device for applying a flexible tape onto a planar sheet. More particularly, the invention relates to a device for laying a deformable, flexible adhesive tape onto a planar sheet under constant tension. Specifically, the present invention relates to a device for applying an insulating tape onto a planar glass sheet as part of the manufacturing process of multi-pane windows.

2. Background Information

The need arises in a variety of manufacturing environments to apply a flexible tape onto a planar sheet. For example, adhesive tape is often utilized to attach machine components to one another. Additionally, it is well known to apply insulating and vibration isolating strips to a variety of machines and building components to either entrap liquids and gases, or alternatively to seal out contaminants. Adhesive elastomeric flexible tapes are also often applied to access panels on machine housings such as air conditioning units and compressors when the machine housing will be subject to weather, or harsh manufacturing environments. Additionally, such flexible tapes are often applied between parallel panes of glass when manufacturing insulated windows and doors.

Specifically, a number of production steps are required in the manufacture of glass units for placement within window and door frames. Thermally insulated, single and multi-pane window and door units include a number of structural elements: wood, aluminum or vinyl frames to encase the glass window; metal spacers which are spaced between the multi-pane glass panes and along the peripheral edge thereof, muntin and mullion strips placed between and contiguous to each glass sheet of the multi-pane window for providing an ornamental appearance, and sealant tape material applied to the perimeter edge of the glass sheets of the multi-pane unit.

Recent innovations in the manufacture of thermally insulative multi-pane windows include suspension of a polyester film coated with a heat insulative material between the panes of glass, and filling the space therebetween with a low conductivity gas, such as argon or krypton, to form a barrier to conductive heat transfer. The film placed between the glass sheets provides a barrier to radiative heat transfer through the window to the external environment.

It is well known in the manufacture of single or multi-pane window units that the manner of treatment and construction of the perimeter edges is critical to the performance of the window. The manner in which the perimeter edges of the glass sheets are made can have a performance degradating effect on the glass sheet when installed in an insulated door or window unit. The perimeter edge of the glass sheet can have a great impact on the overall thermal performance of the insulating window insofar as the center of the glass may register a higher value, yet the edges of the glass will be colder.

The thermal performance of the edge portion of the glass is particularly affected by the manner and method by which the tape material is applied to the perimeter edge of the glass panes. Sealant tape material for application on the perimeter edge of the glass may be manufactured of a variety of materials including polyisobutylene, or butyl hot melt, adhesive or a polymerizable plastic material injected by a nozzle placed adjacent the perimeter edge of the glass sheet. By way of example, one such sealant strip is manufactured by Tru Seal Technologies, Inc. and is sold under the trademark Swiggle® Strip. Swiggle® Strip has been found to be a convenient product in the manufacturing of double glazed windows. At room temperature, the product has considerable adhesive properties and is applied to the glass sheet to provide a hermetic barrier to the area where the frame fits around the perimeter edges of the glass sheet. Moisture seepage and conductive heat loss are thus prevented by the air-tight adhesion of the sealant strip to the glass sheets. Additionally, the sealant strip assures that the low conductivity argon or krypton gas remains trapped between the window panes.

In a multi-pane window, the sealant tape material is applied to the perimeter edge of one glass sheet to provide an air and water tight hermetic seal between the edges of the glass sheet on which it is laid, and a second sheet positioned on top of the sealant tape. Adhesive properties of the sealant tape material are designed to prevent fogging problems from developing due to a sealant tape leak, either between the sealant tape and the edge of either one or both of the glass sheets or between the sealant tape and the wood, aluminum or vinyl frame unit in which the multi-pane window is encased. When the hermetic adhesion of the sealant tape material fails, moisture in the air condenses in the space between the glass panes, and fogging occurs. Thus, the quality of the multi-pane window is marred by the fogging occurring between the glass sheets, and also, the heat insulative qualities of the multi-pane window are degraded by the sealant tape leak.

From the foregoing, it is obvious that the application of the sealant tape material is a critical problem in the overall manufacture and thermal performance of any glass unit, whether a single pane or multi-pane glass window.

The prior art discloses a number of devices for applying a sealant tape material to the perimeter edges of glass sheet material. Some examples of the prior art are U.S. Pat. No. 3,886,113 to Bowzer, U.S. Pat. No. 3,990,570 to Mercier, U.S. Pat. No. 4,088,522 to Mercier, U.S. Pat. No. 4,145,237 to Mercier and U.S. Pat. No. 4,546,723 to Leopold.

In the past, Swiggle® Strip has been applied by hand. Specifically, the strip is rolled off of a roll, aligned along the edge of the glass by hand and pressed down to adhere to the glass. Once the strip has been applied around the entire perimeter of the first pane of glass, the second pane is placed on top of the strip, and the entire unit is heated to bond the strip to the glass. While this method is presumably adequate for the purpose for which it is intended, it is disadvantageous because of inconsistencies in the placement of the strip relative to the edge of the pane, and because of the extensive time required to accurately place the insulated tape.

As a result of the difficulties in manually applying the insulating strip, various devices have been developed in an attempt to facilitate the application process. One such device is disclosed in U.S. Pat. No. 4,756,789 to Kolff.

While this device is also presumably adequate for the purpose for which it was intended, it remains relatively time consuming, and contains the further problem that this device is designed to slide along the surface of the glass as the insulating strip is applied. Because many panes on which an insulating strip is applied are coated, for example by applying the polyester film coated with a heat insulated material between the panes of glass, a device which rubs along the surface of the glass has the potential of scratching or otherwise damaging these coatings.

3

The need thus exists for an applicator which will automatically apply flexible tape material to a planar sheet such as an insulating strip to a glass pane without contacting the glass pane. Additionally, the need exists for an applicator which will apply insulating flexible tapes to a glass pane along a predetermined path, and which assures that the strip remains accurately positioned adjacent the edge of the glass pane, and which will accurately form each corner thus providing a continuous strip about the perimeter of the glass pane.

SUMMARY OF THE INVENTION

Objectives of the invention include providing an automated applicator for applying flexible tape material to a planar sheet.

A further objective is to provide an applicator for applying flexible insulating tape to the perimeter of a glass pane.

Another objective is to provide an applicator for bringing the edge portion of a flexible tape into contact with a planar sheet.

Yet a further objective is to provide an applicator which will accurately bend the flexible tape adjacent each corner of the planar sheet.

Still another objective is to provide an applicator for applying a flexible tape to a glass pane wherein the flexible tape is swiggle® seal.

Still a further objective is to provide an applicator which maintains a constant tension on the tape such that the tape is neither stretched nor compressed during application thereby assuring that the tape maintains a constant cross-sectional configuration.

A still further objective is to provide an applicator in which constant pressure is applied to the tape during application to the glass pane.

Yet another objective is to provide an applicator in which a sensor is associated with a pressure roller to assure that the pressure roller is rotating.

Another objective is to provide an applicator which moves the spool with the applicator head thereby minimizing the distance traveled by the flexible tape from the spool to the application zone.

Still a further objective is to provide an applicator in which the glass remains in the horizontal plane when flexible tape is applied thereto.

A still further objective is to provide an applicator which registers the placement of marks onto the flexible tape relative to the movement of the head through the Cartesian coordinate system, rather than equally spacing the marks along predetermined lengths of the flexible tape.

Another objective is to provide an applicator head having a motor for unreeling flexible tape, the speed of operation of which is initially set to correspond to the speed of the robotic arm.

Still a further objective is to provide an applicator in which the speed of the motor unreeling flexible tape from the spool increases and decreases in response to the tension on the flexible tape and the amount of flexible tape on the spool to assure that the flexible tape remains in constant tension.

Another objective is to provide an applicator having an applicator head mounted onto a programmable robotic arm.

Still another objective is to provide an applicator which is of simple construction, which achieves the stated objectives in a simple, effective and inexpensive manner, and which solves problems and satisfies needs existing in the art.

4

These and other objectives and advantages of the invention are obtained by the improved flexible tape applicator of the present invention, the general nature of which may be stated as including an applicator head having a path of travel, a flexible tape path extending at least partially through the applicator head, and an application zone; a table adapted to retain the sheet adjacent the applicator head; first drive means for moving the applicator head relative to the object along the path of travel at preselected speeds; data collection means for collecting data related to the speed of the first drive means; second drive means for driving the flexible tape; and a control means operatively connected to the second drive means for receiving data from the data collection means and for altering the speed of the second drive means in response to said collected data and for maintaining a proportional relationship between the speed of operation of the second drive means and the speed of operation of the first drive means whereby the tension on the flexible tape remains substantially constant throughout the path of travel of the applicator head.

BRIEF DESCRIPTION OF THE DRAWINGS

The preferred embodiment of the invention, illustrative of the best mode in which applicants have contemplated applying the principles, is set forth in the following description and is shown in the drawings and is particularly and distinctly pointed out and set forth in the appended claims.

FIG. 10 is an enlarged end elevational view of the applicator head with portions broken away and looking in the direction of line 10—10, FIG. 8;

FIG. 11 is an enlarged end elevational view of the applicator head with portions broken away and in section, and looking in the direction of line 11—11, FIG. 8;

Similar numerals refer to similar parts throughout the drawings.

DESCRIPTION OF THE PREFERRED EMBODIMENT

Figure 1:
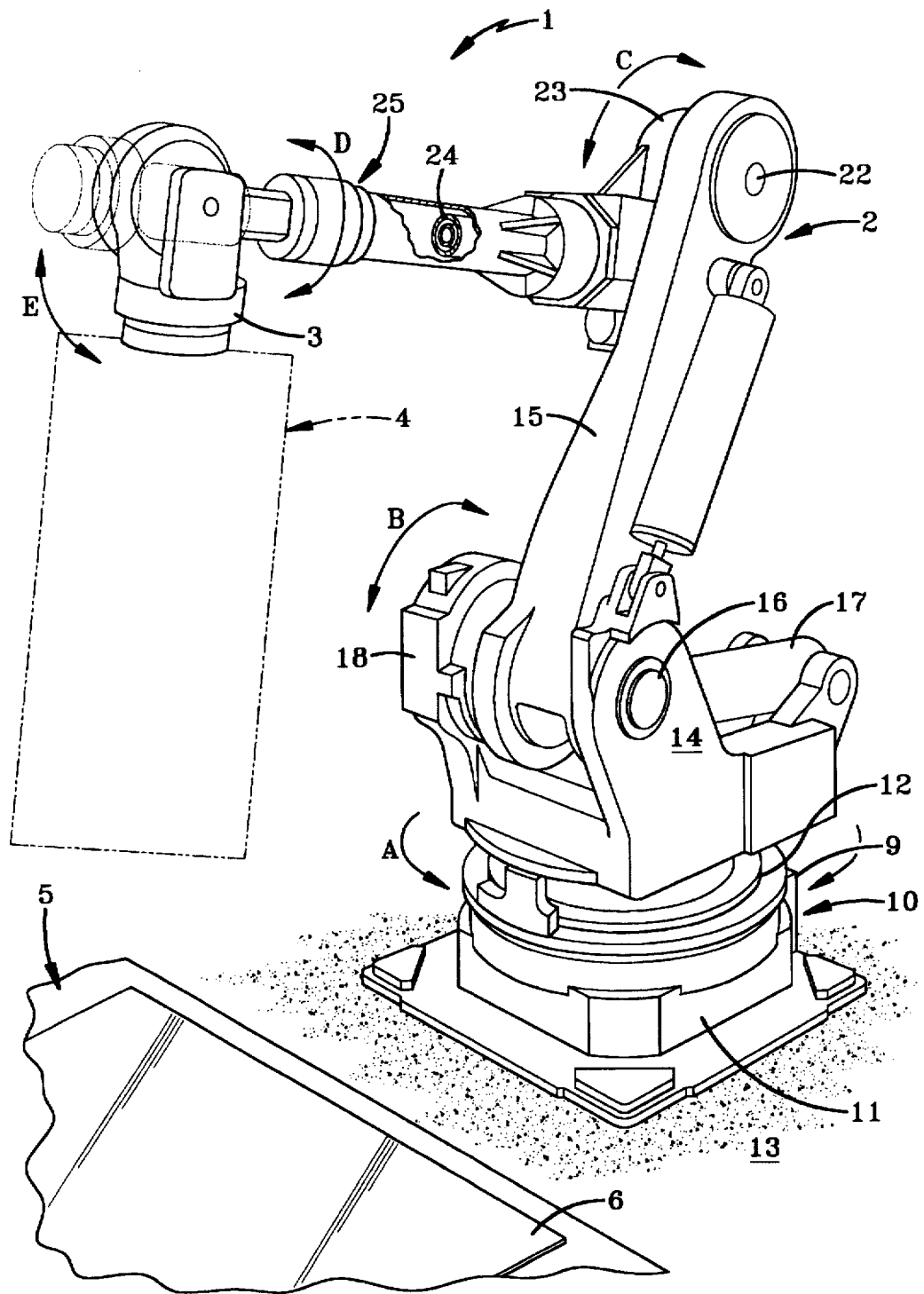
FIG. 1 is a perspective view of the robotic arm with portions broken away and in section, and shown with an applicator head in dot-dash lines, and in combination with a planar sheet support table.

The improved flexible tape applicator of the present invention is indicated generally at 1, and is particularly shown in FIGS. 1–6. Applicator 1 includes a robotic arm 2, having a mounting pad 3. Mounting pad 3 is sized to receive an applicator head 4, shown schematically in dot-dash lines in FIG. 1. A support table 5 is positioned below applicator head 4 for supporting a planar sheet 6 thereon. While support table 5 may have a variety of sizes and configurations, in the preferred embodiment it is either a roller table or an air table for supporting planar sheet 6, and is part of a conveyor unit extending outwardly beyond robotic arm 2 such that glass sheets may be moved along the top surface of support table 5 from a previous work station, to a position beneath applicator head 4, to a subsequent position in a manufacturing line.

Robotic arm 2 may have a variety of sizes and configurations, and must have at least three degrees of freedom to assure that applicator head 4 is movable through the Cartesian coordinate system. In the preferred embodiment, robotic arm 2 is manufactured by Nachi Robotics of 22285 Roethel Drive, Novi, Mich. 48375 under the Model No. SA-130.

Inasmuch as robotic arm 2 is commercially available, a description of the same will be given only in summary, and only to the extent necessary to understand the invention. Robotic arm 2 includes a base 10 having a stationary mounting pad 11 and a bearing plate 12 rotatably mounted on mounting pad 11 to provide movement of bearing plate 12 relative to mounting pad 11 in the direction of arrow A shown in FIG. 1. While mounting pad 11 may be mounted to a variety of surfaces including floors, walls and ceilings, in the preferred embodiment, mounting pad 11 is secured to horizontal support surface 13. A carriage 14 is secured to bearing plate 12 and rotates therewith. A first motor 9 operatively communicates with bearing plate 12 such that first motor 9 rotates bearing plate 12 relative to mounting pad 11. A base arm 15 is pivotally secured to carriage 14 via a pivot pin 16 and is counterbalanced against uncontrolled movement via counterbalance 17. A second motor 18 operatively communicates with base arm 15 to move base arm 15 in the direction of arrow B shown specifically in FIG. 1.

An upper arm 21 is secured to base arm 15 via a pivot pin 22 with a third motor 23 providing rotational movement of upper arm 21 relative to base arm 15 in the direction of arrow C shown specifically in FIG. 1. As can be seen from the above discussion, first motor 9, second motor 18 and third motor 23 operate to move upper arm 21 through the Cartesian coordinate system.

A plurality of concentric drive shafts 24 extend along the length of upper arm 21 and extend between a fourth motor (not shown) and a wrist section 25. Drive shafts 24 operate to rotate wrist section 25 in the direction of arrow D (FIG. 1). Mounting pad 3 may also be rotated in the direction of arrow E. Robotic arm 2 thus provides a plurality of motors to move mounting pad 3 throughout the Cartesian coordinate system in the direction of arrows A, B and C (FIG. 1). Additionally, wrist section 25 may be rotated in the direction of arrow D with mounting pad 3 also movable in the direction of arrow E. Robotic arm 2 is first moved in the direction of arrows A, B and C to position the head relative to the workpiece, and is then operated to orient mounting pad 3 relative to support table 5 by operating wrist section 25 to move in the direction of arrow D, and by rotating mounting pad 3 in a direction indicated at arrow E.

Having now generally described robotic arm 2, applicator head 4 includes a U-shaped frame 30 (FIGS. 2–6) having a body 31 and a pair of parallel and spaced apart upper and lower legs 32 extending outwardly therefrom whereby body 31 and upper and lower legs 32 define a U-shaped cradle 33. Body 31 includes a pair of parallel and spaced apart vertical beams 34, and a pair of end brackets 35 extending intermediate vertical beams 34 adjacent each end thereof. Upper leg 32 includes a pair of parallel and spaced apart substantially horizontal support beams 36, each of which is attached to one side of body 31. Referring specifically to FIGS. 3 and 4, a U-shaped mounting bracket 37 is mounted to the exterior of body 31 and includes a bearing set 38 mounted thereto. An axle 41 extends through U-shaped mounting bracket 37 and body 31 and is rotatably supported within bearing set 38. A spool 42 of a flexible tape 43 is fixedly mounted on axle 41 within cradle 33 and intermediate upper and lower legs 32. Spool 42 is retained on axle 41 via a hand knob 44 threadably secured on the end of axle 41. Hand knob 44 is removable to permit spool 42 to be replaced as required.

A drive pulley 45 is also mounted to axle 41 within U-shaped mounting bracket 37. A motor mounting plate 46 (FIG. 5) is secured to body 31 and supports a drive motor 47. Drive motor 47 includes a drive shaft 48 with a drive pulley 49 mounted thereon whereby drive pulley 49 is coplanar with driven pulley 45. A drive belt 52 extends around driven pulley 45 and drive pulley 49 such that activation of drive motor 47 will cause drive shaft 48 and interconnected drive pulley 49 to rotate. Rotation of drive pulley 49 causes driven pulley 45 and interconnected axle 41 to rotate. As axle 41 rotates, spool 42 rotates therewith thereby unwinding flexible tape 43.

Figure 5:
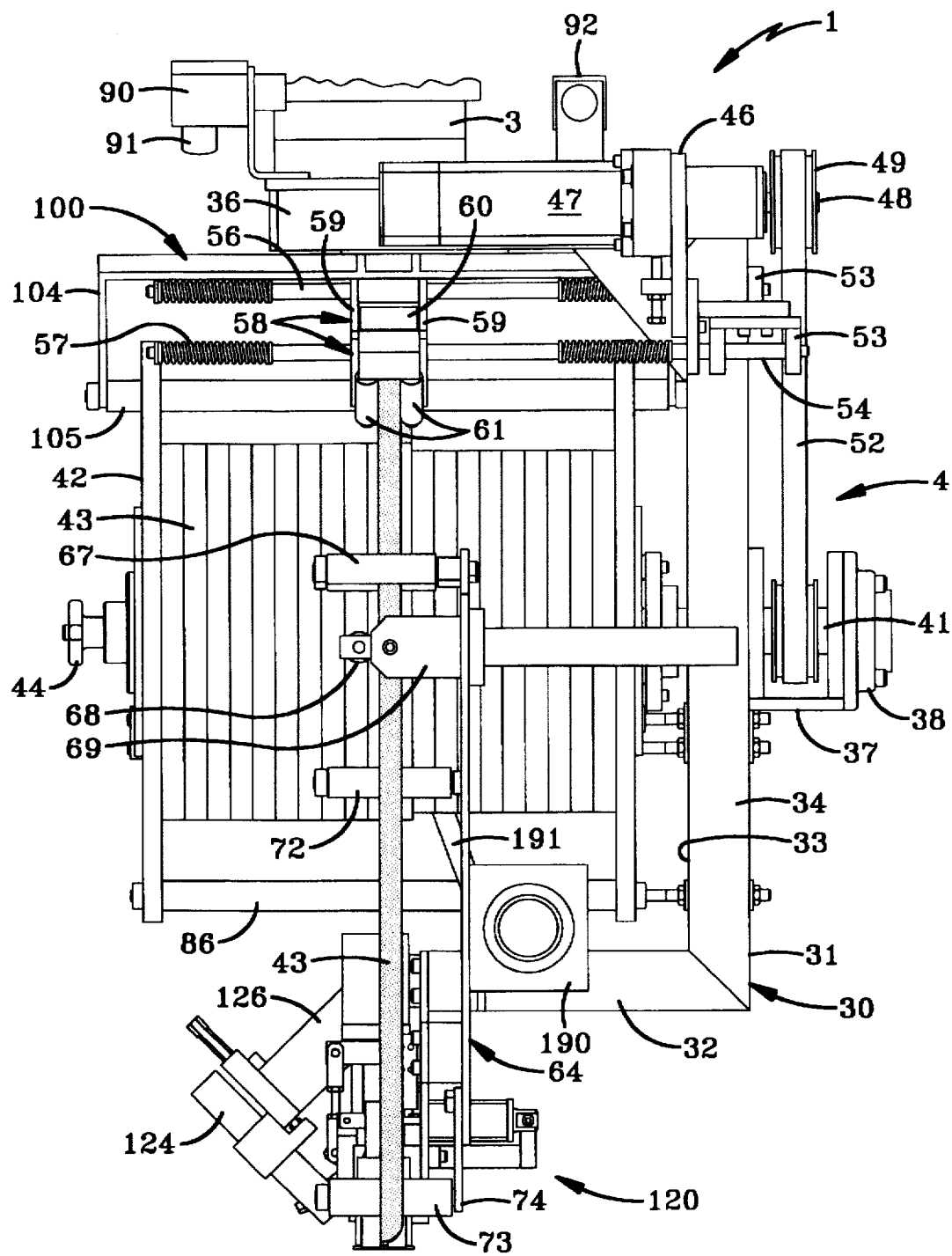
FIG. 5 is an end elevational view of the applicator head opposite the end elevational view shown in FIG. 4.
Figure 6:
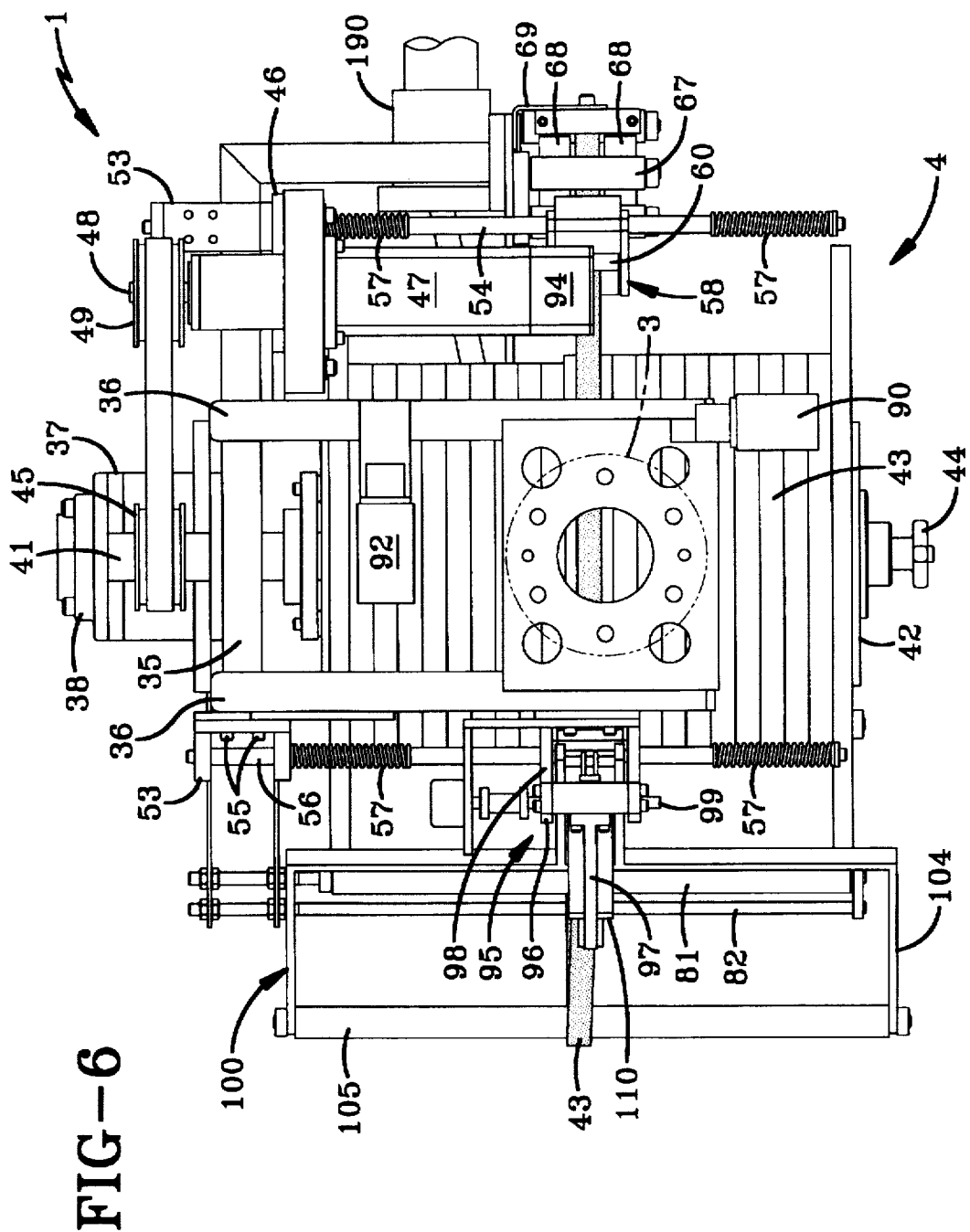
FIG. 6 is a top plan view of the applicator head shown in FIG. 2.

A U-shaped roller mounting bracket 53 (FIG. 5) is secured to motor mounting plate 46 and retains a slide rod 54 above spool 42. A U-shaped mounting plate 53 also extends outwardly from the side of body 31 via bolts 55 (FIG. 6). A slide rod 56 extends through apertures formed in U-shaped mounting bracket 53 and is substantially parallel to slide rod 54 and is supported above spool 42.

A coil spring 57 extends over each end of slide rod 54 and 56 and is coaxial therewith. A follower 58 is slidably mounted on each slide rod 54 and 56 and includes a pair of parallel and spaced apart sidewalls 59 (FIGS. 4 and 5), and a pair of horizontal support rollers 60 mounted therebetween. A pair of parallel and spaced apart vertical guide rollers 61 extend upwardly on either side of support rollers 60 and are spaced apart a distance equal to the width of flexible tape 43. Support rollers 60 thus engage flexible tape 43 along its width with each vertical guide roller 61 engaging an edge of flexible tape 43. Each follower 58 is slidably mounted on a slide rod 54 and 56 and moves along the associated slide rod in response to movement of flexible tape 43 across the axial length of spool 42. Specifically, as spool 42 rotates via its interconnection with drive motor 47, each revolution of spool 42 will unwind an additional wrap of flexible tape 43. As each successive wrap of flexible tape 43 is removed from spool 42, the point at which flexible tape 43 is removed from spool 42 will displace axially along the length of spool 42. As the point of removal from spool 42 axially displaces, followers 58 respond thereto by moving along the length of slide rods 54 and 56. Coil springs 57 prohibit the associated follower 58 from sliding off of the associated slide rod 54 or 56 respectively.

An L-shaped roller support plate 64 is mounted to body 31 adjacent lower leg 32 and includes a horizontal portion 65 and a vertical portion 66. Referring specifically to FIGS. 3 and 5, a pair of parallel and spaced apart guide rollers 67 which have a center axis substantially parallel to axle 41 are mounted to the top of vertical portion 66 of roller support plate 64. Guide rollers 67 thus engage flexible tape 43 across its width. A U-shaped bracket 69 is mounted to roller support plate 66 just below guide rollers 67. A pair of second guide rollers 68 having a center axis substantially perpendicular to axle 41 are mounted to U-shaped bracket 69 with each roller 68 engaging an edge of flexible tape 43. A third guide roller 72 and a fourth guide roller 73 are attached to roller support plate 64 and are parallel to and spaced apart from first guide roller 67 with roller 73 being mounted to the bottom of a roller support plate 64 via a roller mounting plate 74.

Figure 2:
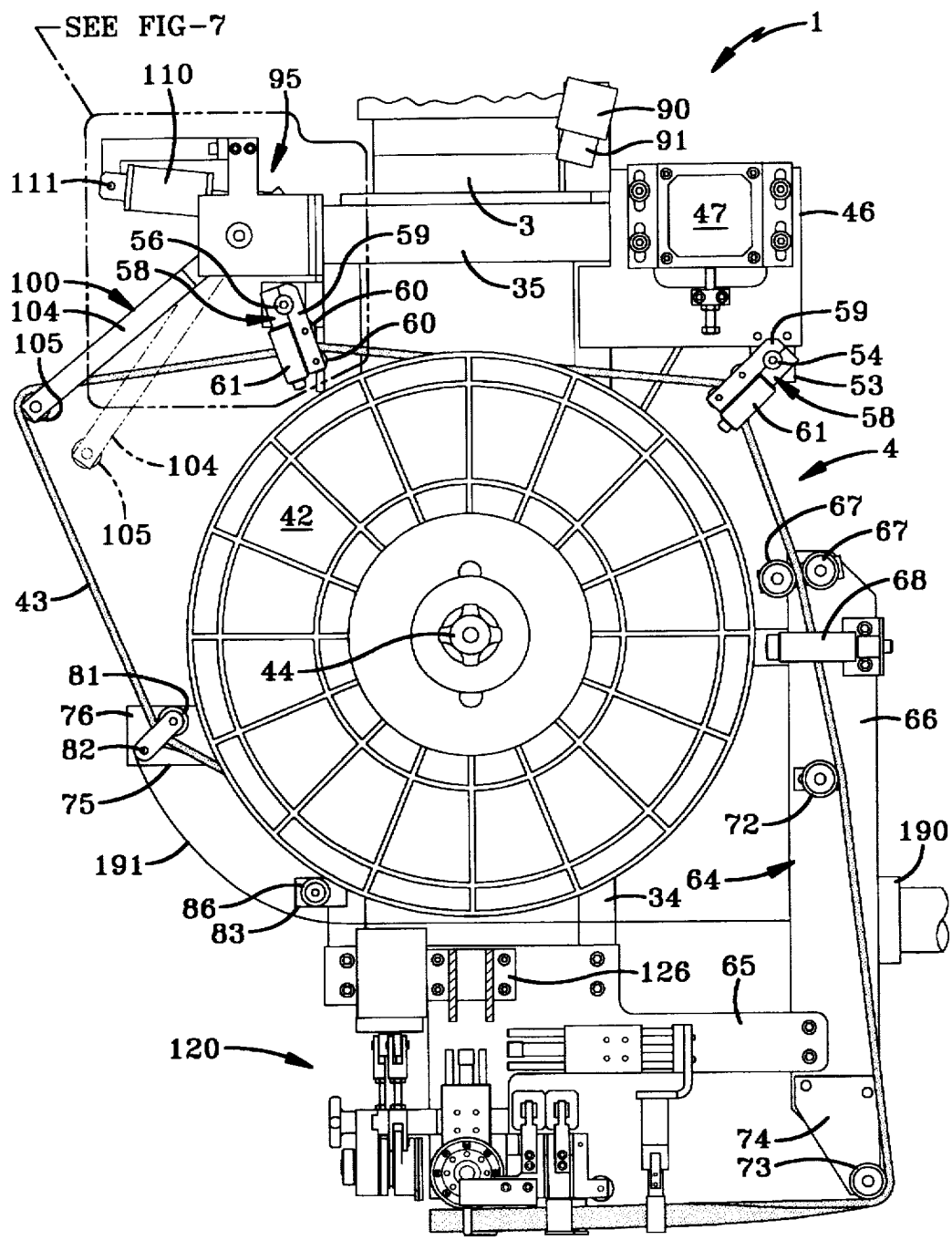
FIG. 2 is a side elevational view of the applicator head with the printer removed.
Figure 3:
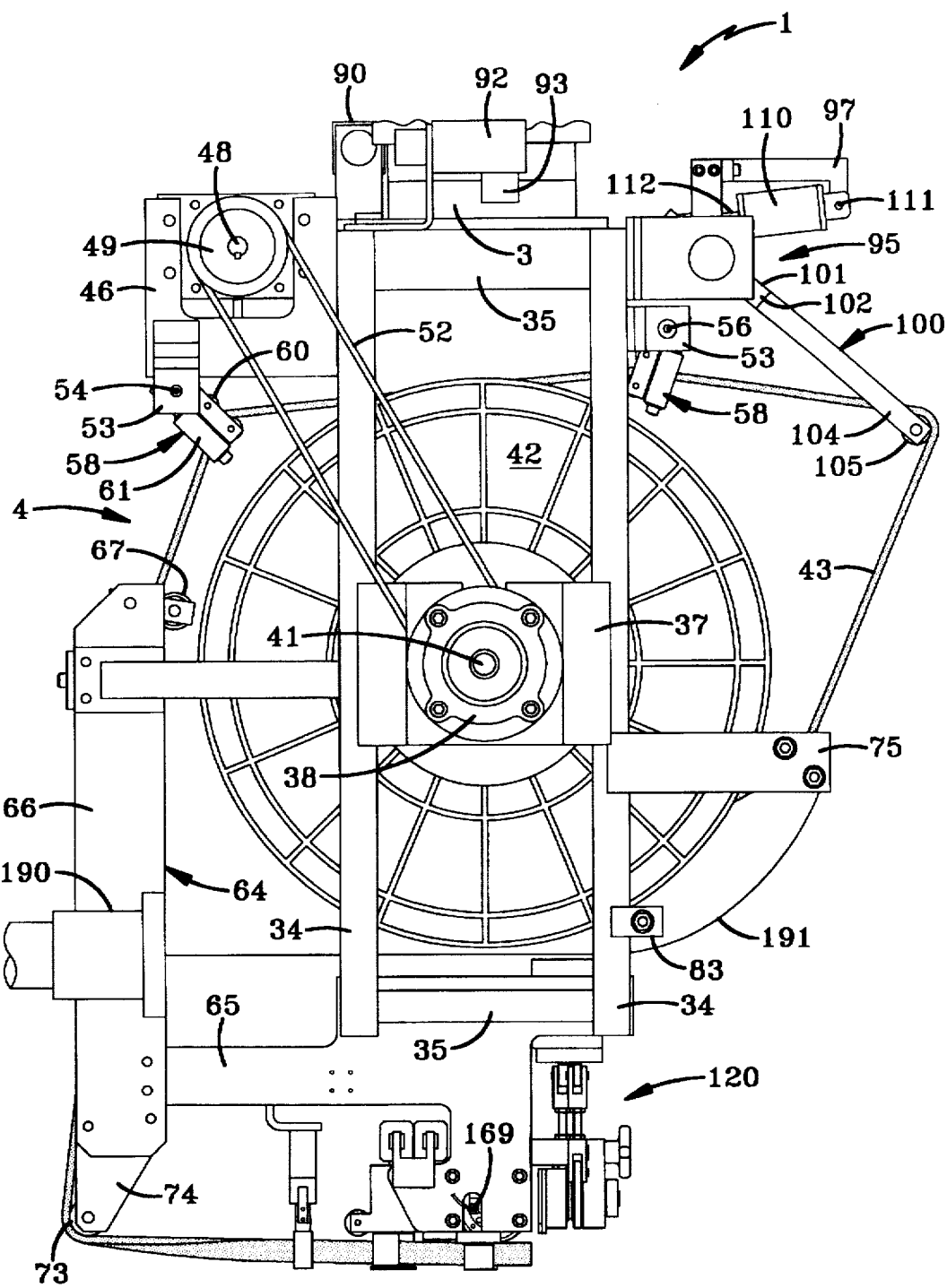
FIG. 3 is a side elevational view of the applicator head opposite the side elevational view shown in FIG. 2.
Figure 4:
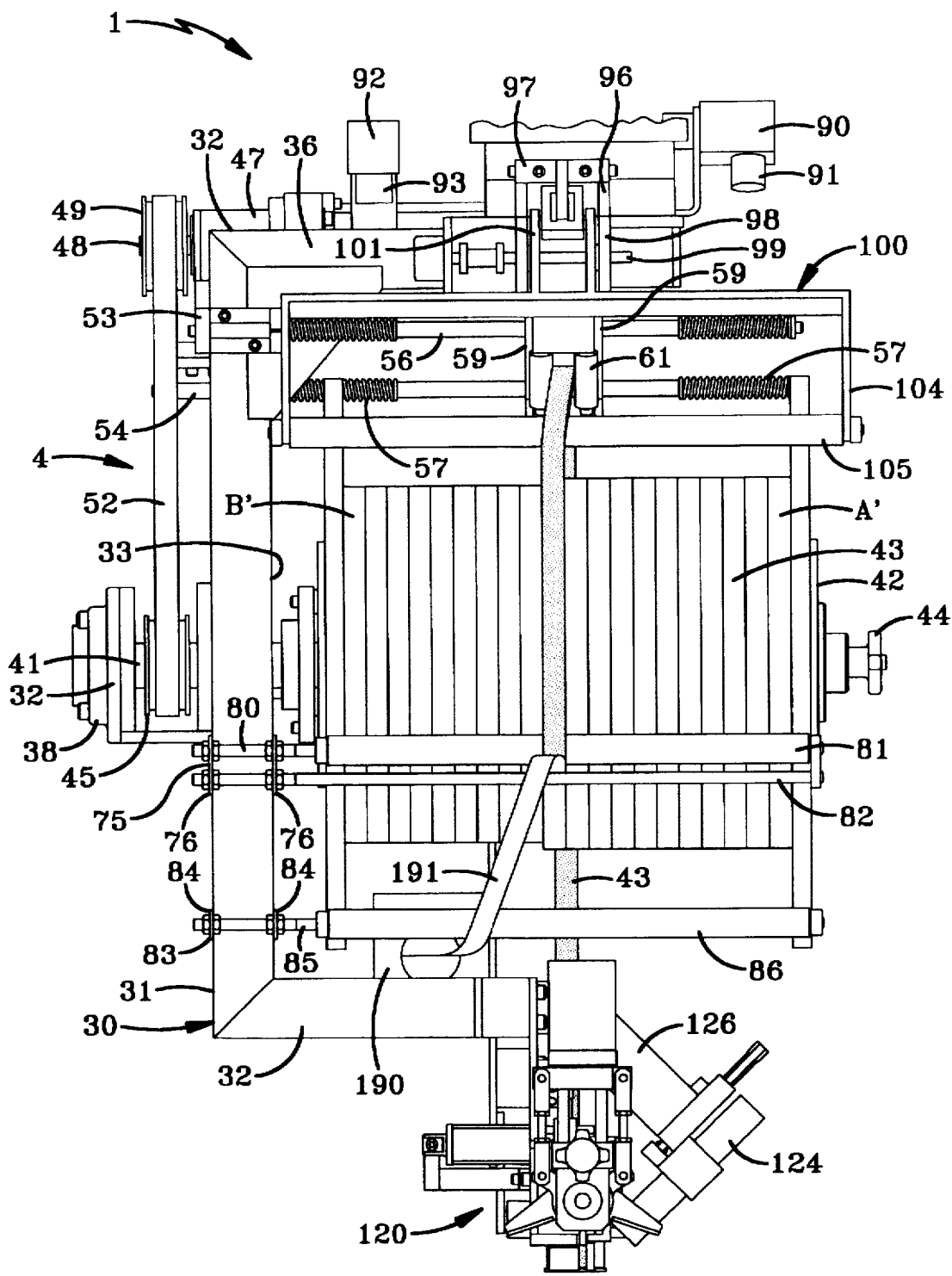
FIG. 4 is an end elevational view of the applicator head shown in FIG. 2.

A first roller support bracket 75 extends outwardly from body 31 of frame 30 opposite first roller support plate 64 (FIGS. 2–4). First roller support bracket 75 includes a pair of parallel and spaced apart sidewalls 76. Sidewalls 76 support a rod 80 having a roller 81 rotatably mounted thereon. A separator roller 82, parallel to and spaced apart from rod 80, is also supported from sidewalls 76 of first roller support bracket 75. A second roller support bracket 83 having a pair of sidewalls 84 supports a rod 85 having a separator roller 86 rotatably mounted thereon. Separator rollers 86 and 82, and roller 81 are cantileverly supported outwardly from first and second roller support brackets 75 and 83 respectively.

A mounting pad 87 (FIG. 6) is secured intermediate horizontal beams 36 of upper leg 32 and is complementary related to mounting pad 3 of robotic arm 2. A complementary relationship between mounting pad 87 of applicator head 4 and mounting pad 3 of robotic arm 2 assures that applicator head 4 may be mounted to robotic arm 2 for movement through the Cartesian coordinate system and for rotation about a center axis.

A first optical or acoustic sensor 90 is positioned adjacent the end of one horizontal beam 36. Sensor 90 includes a beam output 91 (FIGS. 4–6) positioned to project a beam onto spool 42 of flexible tape 43. Particularly, sensor 90 projects a beam onto the wrap indicated generally at A' on FIG. 4 which is positioned adjacent the end of spool 43. Similarly, an optical or acoustic sensor 92 having a beam output 93 is positioned on horizontal beam 36 whereby the beam exiting sensor 92 is projected at the wrap of flexible tape 43 adjacent the other end of spool 42 which wrap is indicated generally at B' in FIG. 4. Both sensors 90 and 92 are electronically connected to a control unit 94 (FIG. 6) also connected to drive motor 47. Control unit 94 is also connected to, and receives information from, robotic arm 2. Specifically, control unit 94 receives information related to the vector velocity of robotic arm 2 to initially set the speed of drive motor 47.

Figure 7:
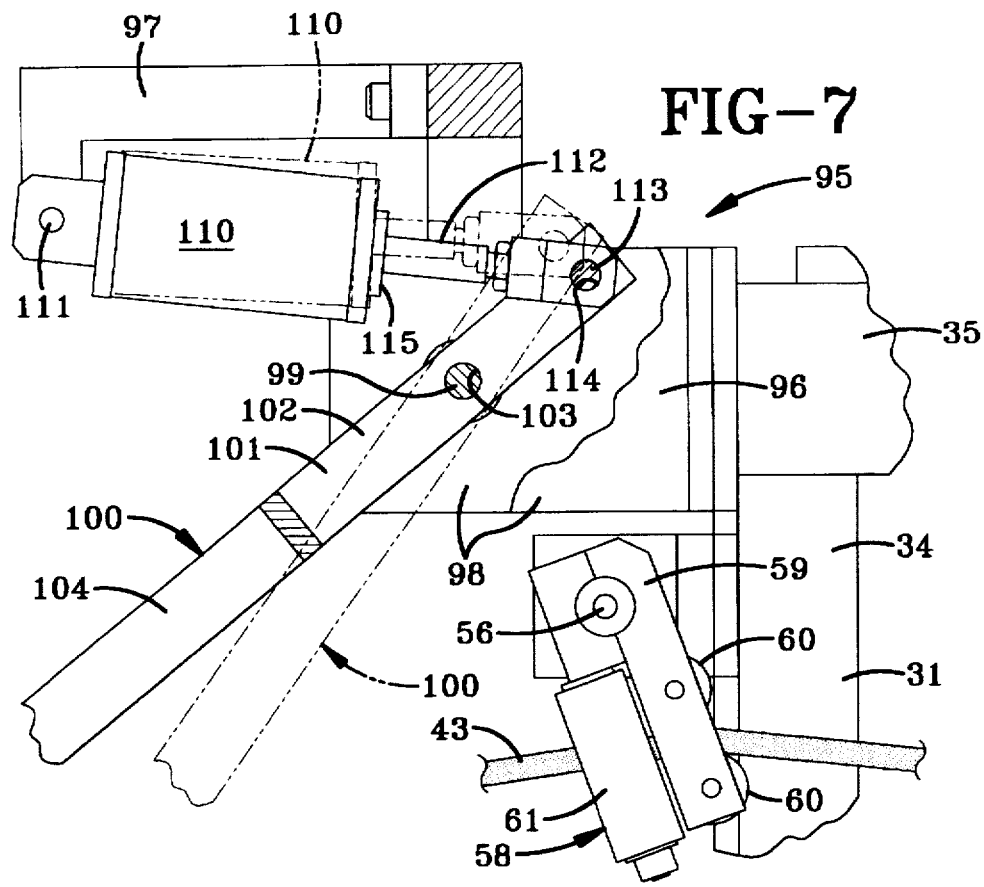
FIG. 7 is an enlarged view with portions broken away and in section, of the encircled portion shown in FIG. 2.

Referring to FIGS. 3 and 7, a dancer arm assembly 95 is attached to body 31 of frame 30 opposite the point of attachment of drive motor 47 to body 31 of frame 30. Dancer arm assembly 95 includes a center pivot bracket 96 and an L-shaped cylinder bracket 97 extending outwardly therefrom. Center pivot bracket 96 includes a pair of parallel and spaced apart legs 98. A pivot pin 99 is mounted to and extends between legs 98 for pivotally supporting a dancer arm 100. Dancer arm 100 is formed with a U-shaped mounting bracket 101 having a pair of parallel and spaced apart legs 102. Legs 102 of U-shaped mounting bracket 101 extend intermediate legs 98 of center pivot bracket 96. Each leg 102 is formed with a hole 103 for receiving pivot pin 99. Pivot pin 99 thus extends through legs 98 of center pivot bracket 96, and through logs 102 of U-shaped mounting bracket 101 to provide pivotal movement of dancer arm 100 relative to center pivot bracket 96. A U-shaped dancer frame 104 is mounted to U-shaped mounting bracket 101, and supports a dancer roller 105 across the open end thereof.

A cylinder 110 is mounted at a pivot 111 to L-shaped cylinder bracket 97 and includes a rod 112 mounted to intermediate legs 102 of U-shaped mounting bracket 101 of dancer arm 100 via a pivot pin 113. Pivot pin 113 extends through rod 112 and a hole 114 extending through each of legs 102. Deflection of dancer arm 100 thus causes rod 112 to insert into, and retract out of, cylinder 110. An electronic sensor 115 is associated with cylinder 110 to measure the movement of rod 112 relative to cylinder 110 and forward such measured data to control unit 94. Alternatively, the radial position of dancer arm 100 may be measured and forwarded to control unit 94.

Referring to FIGS. 3–4, a printer bracket 126 is attached to horizontal portion 65 of roller support plate 64 and supports an applicator assembly 120. Referring specifically to FIGS. 8–12, and in accordance with one of the features of the present invention, a pneumatic cylinder 121 is mounted to a bracket 126 (FIGS. 10 and 11) and includes a piston cylinder rod 122 mounted to a retainer clip 123. A printer 124 is mounted within retainer clip 123 with the operating end extending downwardly toward flexible tape 43 as described in detail below. Printer 124 may take a variety of sizes and configurations including thermal printers and inkjet printers, with an inkjet printer being utilized in the preferred embodiment. A slide rod 125 extends outwardly from retainer clip 123 and is substantially perpendicular to mounting bracket 126 and is received within an aperture formed in a slide block 127. Pneumatic cylinder 121 thus causes printer 124 to move toward and away from flexible tape 43, with the engagement between slide rod 125 and slide block 127 assuring that the movement of printer 124 is substantially perpendicular to mounting bracket 126. A control unit 128 is provided to activate printer 124 at preselected distances of travel of applicator head 4 for purposes described below.

A second pneumatic cylinder 130 (FIG. 8) is mounted to horizontal portion 65 of roller support plate 64 and includes a cylinder rod 131 attached to a mounting axle 132. A pair of slide rods 134 move within a guide block 135 mounted on horizontal portion 65 to guide the movement of mounting axle 132 when acted on by second pneumatic cylinder 130. A pressure roller 136 is rotatably mounted on mounting axle 132 and remains substantially vertical when second pneumatic cylinder 130 is in both the extended and retracted position. Pressure roller 136 engages the upper edge portion of flexible tape 43.

Figure 8:
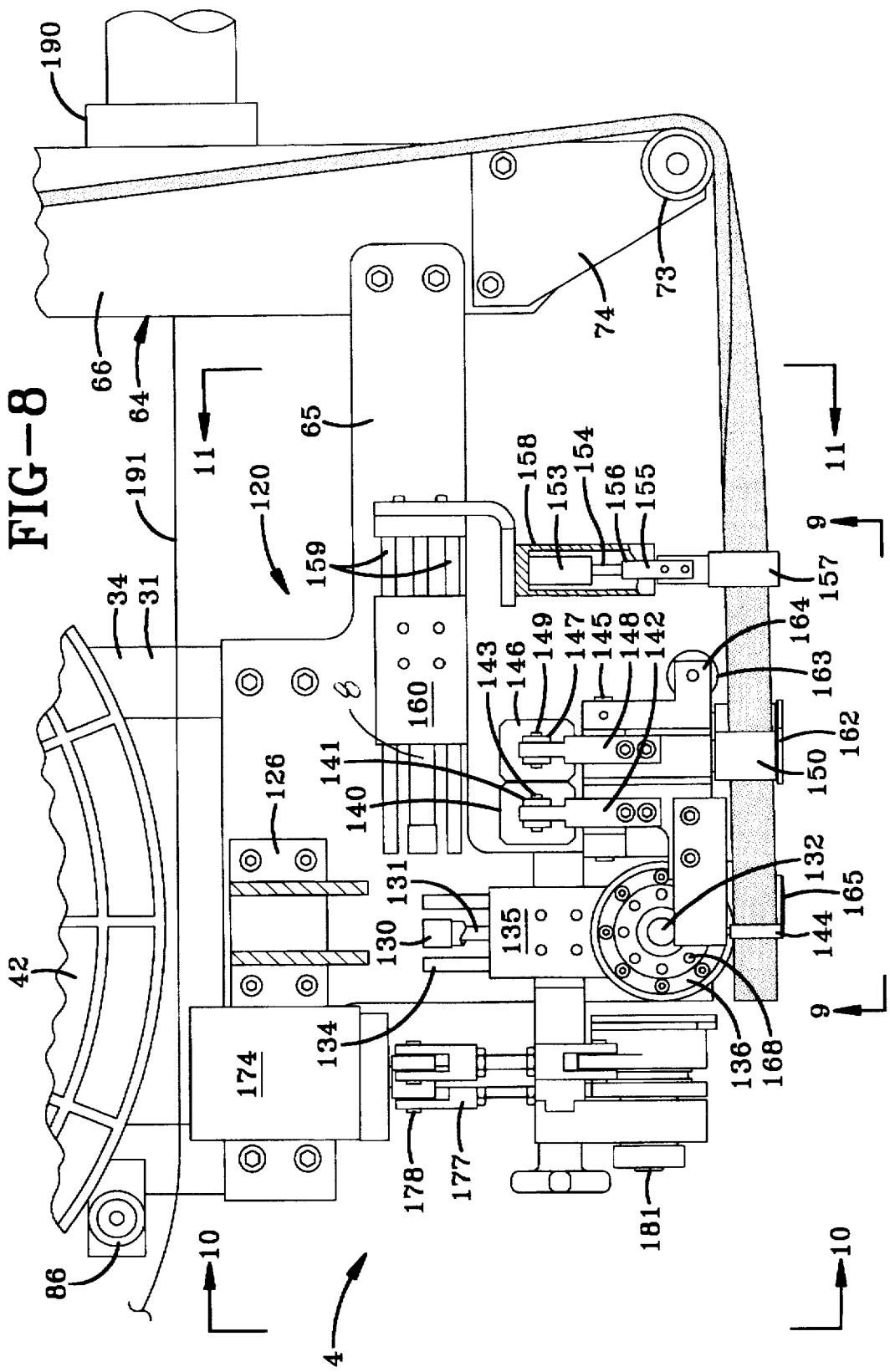
FIG. 8 is an enlarged side elevational view of the applicator head shown in FIG. 2.
Figure 12:
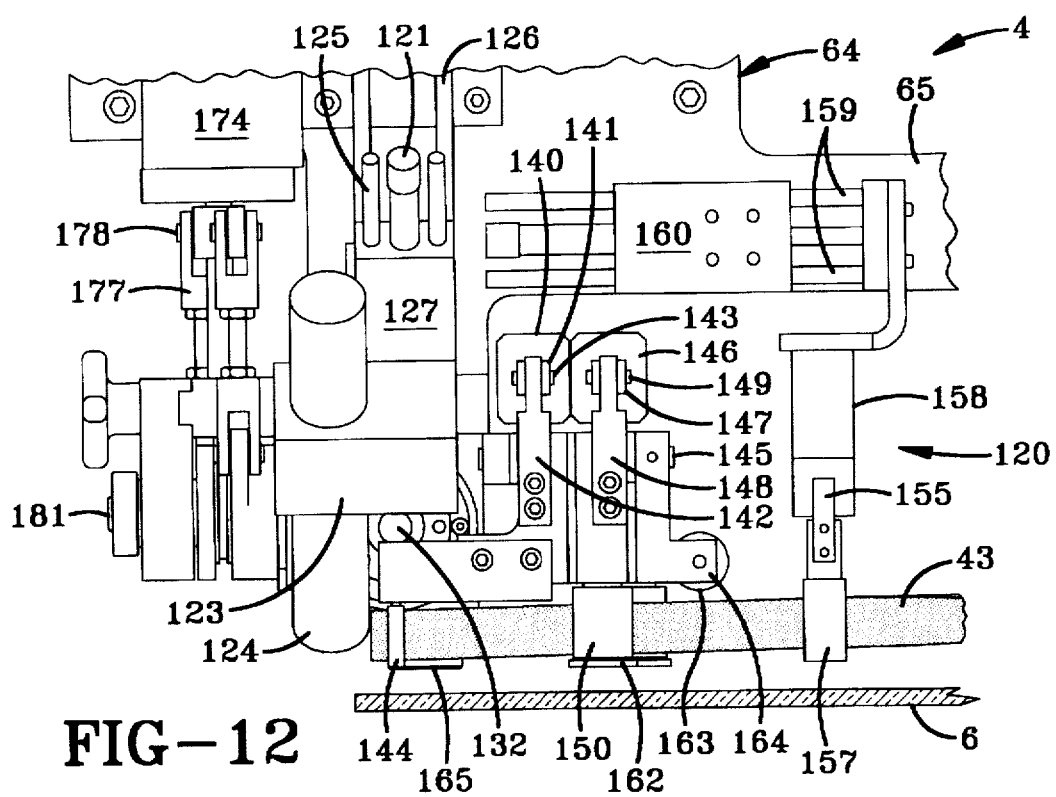
FIG. 12 is an enlarged view of the applicator head similar to FIG. 2 shown in a first position.

A third pneumatic cylinder 140 is mounted to horizontal portion 65 of roller support plate 64 and is mounted substantially horizontal and includes a cylinder rod 141 (FIG. 8). Cylinder rod 141 is attached to a mounting block 142 at a pivot 143. Mounting block 142 carries a pincher pin roller 144 which extends downwardly from the lower end of mounting block 142. Mounting block 142 is rotatably mounted to roller support plate 64 via a cylindrical rod 145. Mounting block 142 is rotatably mounted to cylindrical rod 145 intermediate pivot 143 and pincher pin roller 144. Operation of third cylinder 140 thus causes cylinder rod 141 to move thereby causing mounting block 142 and associated pincher pin roller 144 to rotate about cylindrical rod 145.

A fourth pneumatic cylinder 146 is mounted to roller support plate 64 and is substantially parallel with third pneumatic cylinder 140 and includes a cylinder rod 147. Cylinder rod 147 is attached to a mounting block 148 at a pivot 149. Similar to mounting block 142, mounting block 148 is also pivotally mounted on cylindrical rod 145 and carries a pincher roller 150. Activation of fourth pneumatic cylinder 146 thus causes cylinder rod 147 to move within pneumatic cylinder 146 thereby causing mounting block 148 and interconnected pincher roller 150 to rotate about pivot 145.

A fifth pneumatic cylinder 153 is supported from horizontal portion 65 of roller support plate 64 and includes a cylinder rod 154. Cylinder rod 154 is pivotally mounted to a pair of independently mounted movable mounting blocks 155 via a pair of pivots 156. Each mounting block 155 is pivotally mounted on a stabilizer block 158 and has a pincher roller 157 mounted thereon. Activation of fifth pneumatic cylinder 153 thus causes cylinder rod 154 to move into, and out of pneumatic cylinder 153. As cylinder rod 154 moves, mounting blocks 155 pivot about stabilizer block 158 thereby raising and lowering pincher rollers 157 in the manner described below. Additionally, fifth pneumatic cylinder 153 and interconnected pincher rollers 157 are mounted to a pair of horizontally extending slide rods 159 which are received in through apertures formed in a guide block 160. Slide rods 159 may be moved within guide block 160 to move the position of pincher rollers 157 relative to pincher roller 150 and 144. Movement of slide rods 159 may be manual, or automatic via a pneumatic cylinder 8 (FIG. 8) in order to move pincher rollers 157 between a forward and retracted position. A horizontal roller 163 is rotatably mounted on a mounting bracket 164 to contact the upper edge of flexible tape 43, and is positioned intermediate pincher roller 150, and pincher rollers 157.

Figure 9:
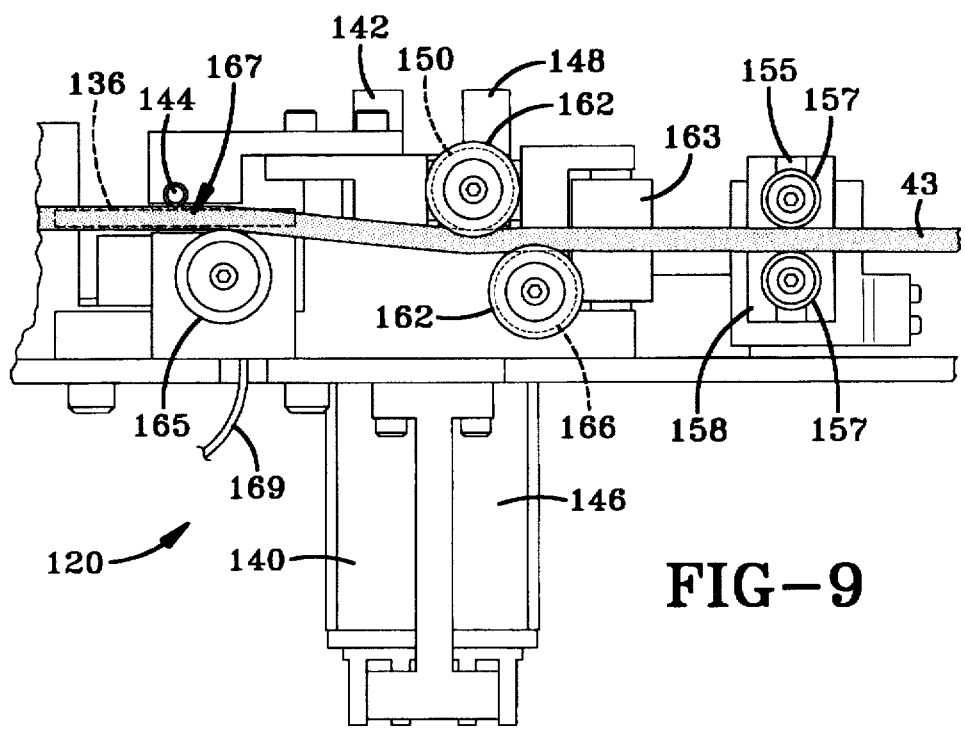
FIG. 9 is an enlarged bottom plan view of the applicator head with portions broken away, and looking in the direction of line 9—9, FIG. 8.

Referring to FIGS. 8 and 9, a first stationary roller 165 is positioned adjacent pincher pin roller 144 and is spaced from roller 144 a distance equal to the width of flexible tape 43. Additionally, pressure roller 136 is positioned intermediate pincher pin roller 144 and first stationary roller 165 thereby defining an application zone 167. Application zone 167 is the area where flexible tape 143 is applied to planar sheet 6. A second stationary roller 166 is positioned adjacent pincher roller 150 and is also spaced apart therefrom a distance equal to the width of flexible tape 43.

A pressure roller 136 is formed with a plurality of holes 168. A third optical sensor 169 (FIG. 9) projects an optical beam at pressure roller 136 adjacent the point where holes 168 will pass thereby. The optical beam projected at pressure roller 136 will alternatively reflect off of roller 136, and pass through a hole 168. Optical sensor 169 assures that by receiving alternative signals, pressure roller 136 is rotating. Alternatively, if optical sensor 169 receives a constant lack of reflection, in a situation where the optical beam constantly passes through holes 168, a control signal is forwarded to control unit 94 to stop the movement of applicator head 4 as these signals reflect that pressure roller 136 is not rotating.

Referring next to FIGS. 10 and 11, a hydraulic cylinder 174 is mounted to horizontal portion 65 of roller support plate 64 and includes a cylinder rod 175. Cylinder rod 175 is secured to horizontal mounting block 176 having a pivot arm 177 mounted to each end thereof via a pivot pin 178. Each pivot arm 177 is pivotally mounted to a scissors blade 179 at a pivot pin 180. Scissors blades 179 are mounted on a common pivot pin 181 positioned intermediate pins 180 and a cutting edge 182. Activation of hydraulic cylinder 174 will thus cause cylinder rod 175 to move toward and away from support table 5 thus causing mounting block 176 and interconnected pivots arms 177 to move. As pivot arms 177 to move, they cause interconnected scissors blades 179 to rotate about pivot pin 181 thereby causing cutting edges 182 to move toward and away from flexible tape 43.

A vacuum port 190 (FIG. 8) is carried by vertical portion 66 of roller support plate 64 and is attached to a vacuum source (not shown). Vacuum port 190 removes a paper tape backing 191 from flexible tape 43 and transfers it to a remote location in a manner described below.

The path of flexible tape 43 begins within flexible tape applicator 1 when it is loaded into cradle 33 on a spool 42. The flexible tape is then taken off of spool 42 and paper tape backing 191 removed via vacuum port 190 and collected in a bag for subsequent disposal. Flexible tape 43 then passes intermediate guide roller 81 and separator roller 82. Paper tape backing 191 is initially fed into vacuum port 190 with the vacuum source providing sufficient force on paper tape backing 191 to continue to remove it from flexible tape 43 adjacent separator roller 82. Paper tape backing 191 thus passes over separator roller 82 and under separator roller 86 to assure that the same does not become tangled with the flexible tape 43 remaining on spool 42.

Flexible tape 43 then passes over guide roller 81, and over dancer roller 105 supported by dancer frame 104 and into follower 58 over support rollers 60 and intermediate guide rollers 61 supported by slide rod 56. Similarly, flexible tape passes over support roller 60 and through an intermediate guide roller 61 of follower 58 mounted on slide rod 54 adjacent drive motor 47. Flexible tape 43 is accurately positioned when passing through followers 58 as the width of flexible tape 43 is contacted by both support rollers 60, and a lateral position remains constant as a result of the contact between guide roller 61 and the edge of flexible tape 43.

Flexible tape 43 thus exits follower 58 movably mounted on slide rod 54 and passes intermediate first guide rollers 67 which contact flexible tape 43 along its widest dimension when viewed in cross section. Flexible tape 43 then passes intermediate second guide rollers 68 which contact flexible tape 43 along the shortest dimension when viewed in cross section. First guide rollers 67 and second guide rollers 68 thus interact to assure that flexible tape 43 remains accurately positioned before flexible tape 43 passes over third guide rollers 73 and fourth guide rollers 74.

Figure 13:
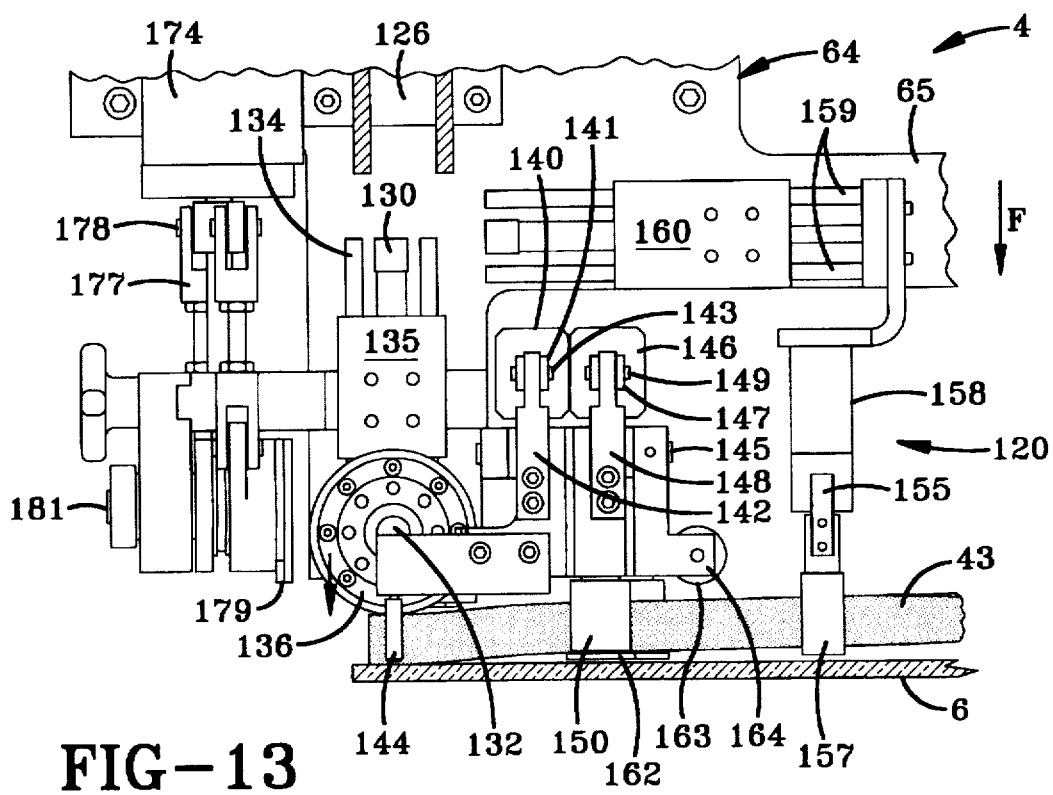
FIG. 13 is an enlarged side elevational view similar to FIG. 12 shown in a second position with the printer removed.

Thus far, flexible tape 43 has remained oriented in a manner identical to its orientation when removed from spool 42. Inasmuch as the edge of flexible tape 43 contacts planar sheet 6, flexible tape 43 is rotated through 90° such that the edge is positioned adjacent planar sheet 6 (FIGS. 2 and 13). Flexible tape 43 then passes between pincher rollers 157 and pincher roller 150 and second stationary roller 166, respectively. Stationary roller 166 and pincher roller 150 are formed with a lower outwardly extending circular flange 162. As flexible tape 43 passes between pincher roller 150 and second stationary roller 166, it also passes beneath horizontal roller 163 and above flanges 162. Flexible tape 43 then passes into application zone 167 intermediate pincher pin roller 144 and first stationary roller 165 and below pressure roller 136. Second cylinder 130 provides constant air pressure on pressure roller 136 to provide a constant downward force onto flexible tape 43 and securely adhere the same to planar sheet 6.

Figure 14:
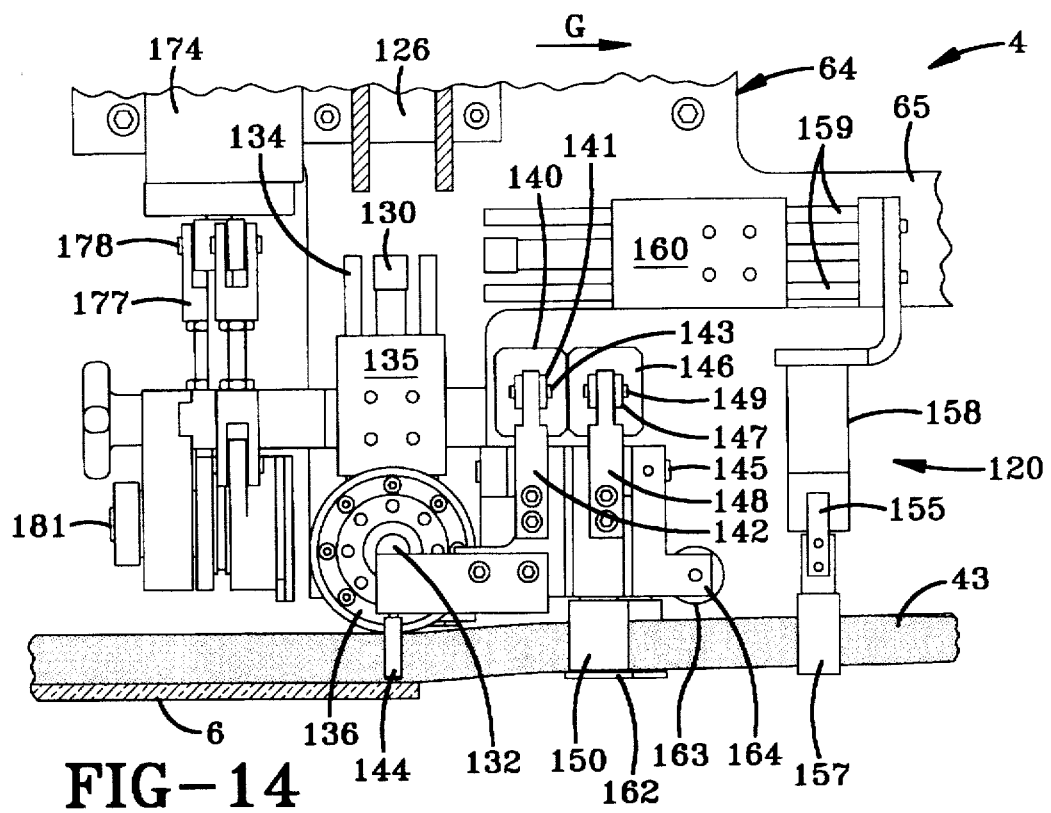
FIG. 14 is an enlarged side elevational view similar to FIG. 13 shown in a third position.
Figure 23:
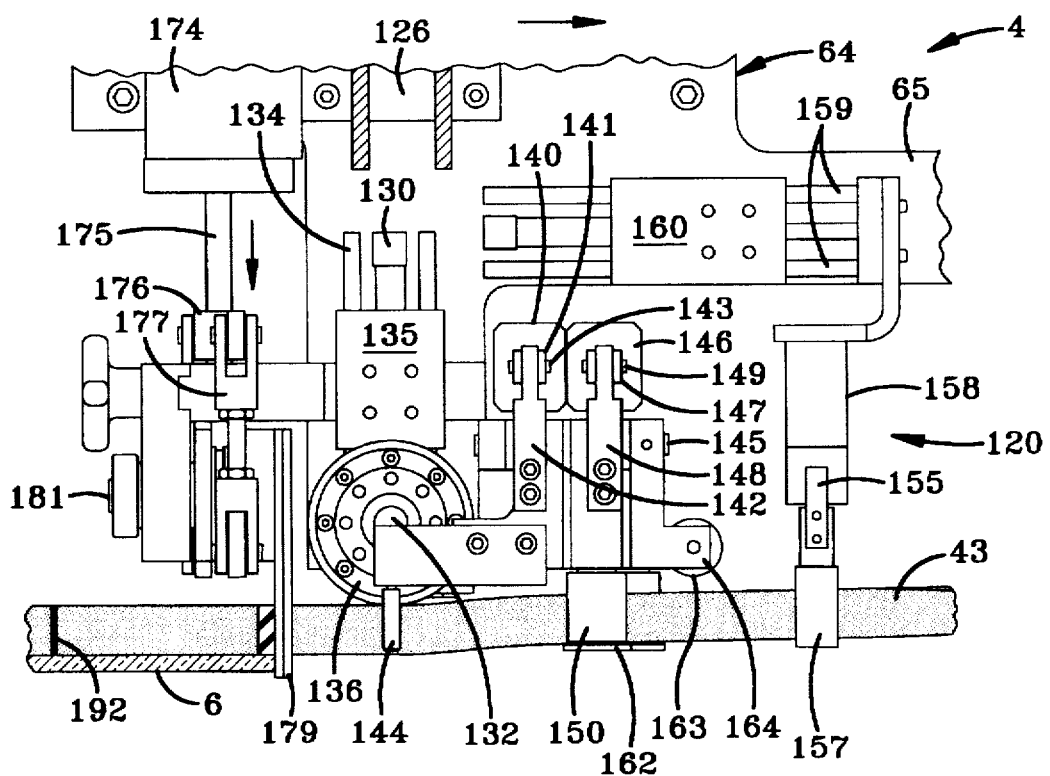
FIG. 23 is an enlarged side elevational view similar to FIG. 14 shown in a ninth position.
Figures 15, 16:
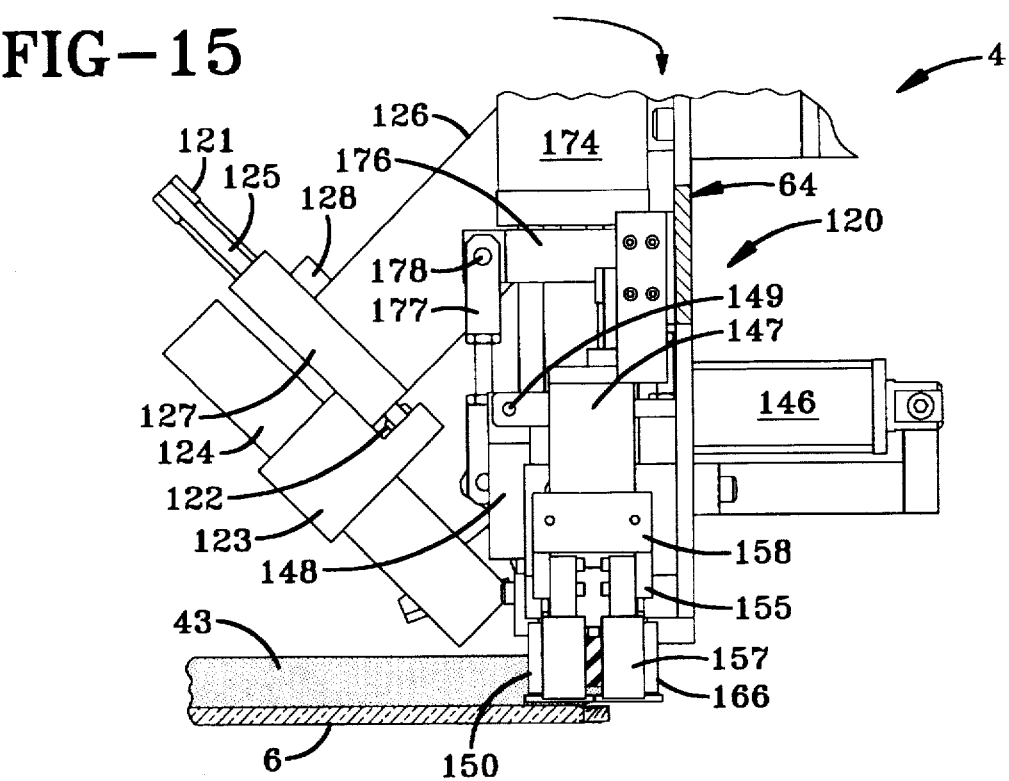
FIG. 15 is an enlarged end elevational view similar to FIG. 5 shown in a fourth position.
FIG. 16 is an enlarged side elevational view similar to FIG. 13 shown in a fifth position.
Figure 17:
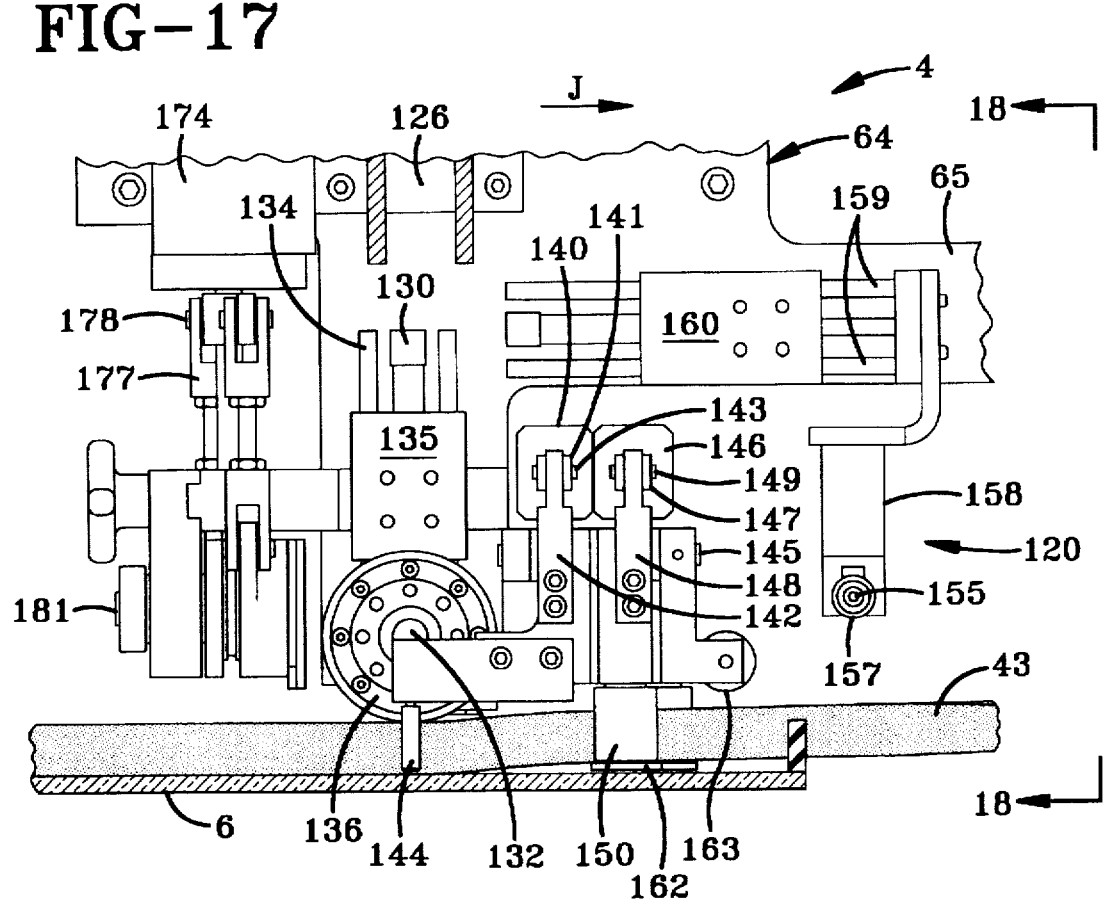
FIG. 17 is an enlarged side elevational view similar to FIG. 13 shown in a sixth position.
Figure 18:
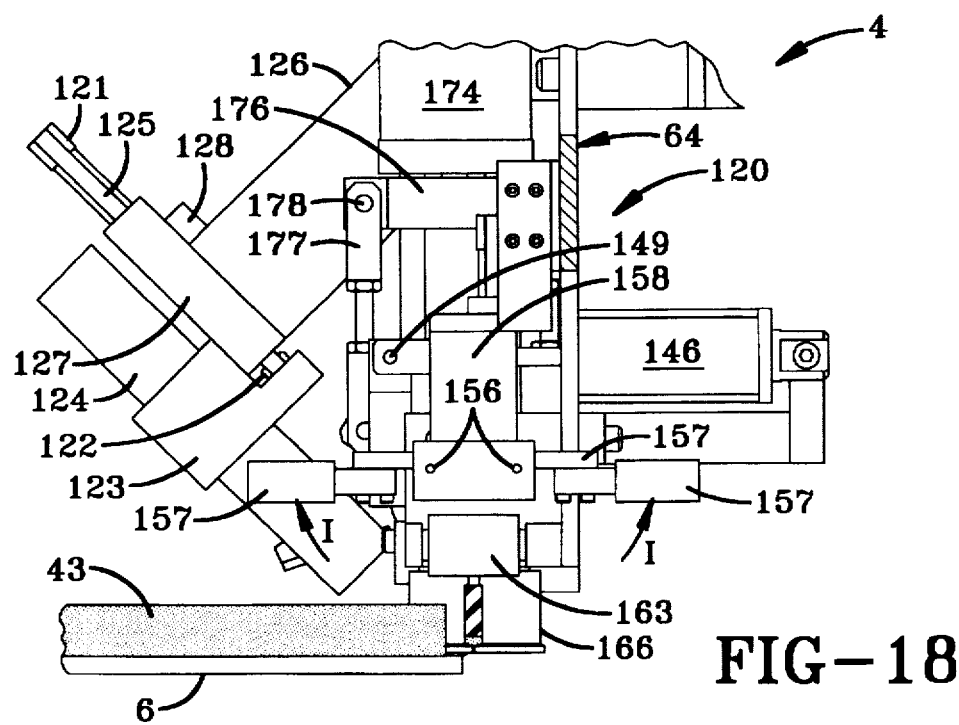
FIG. 18 is an enlarged view of the applicator head shown in the position in FIG. 19 looking in the direction of line 18—18, FIG. 17.
Figure 19:
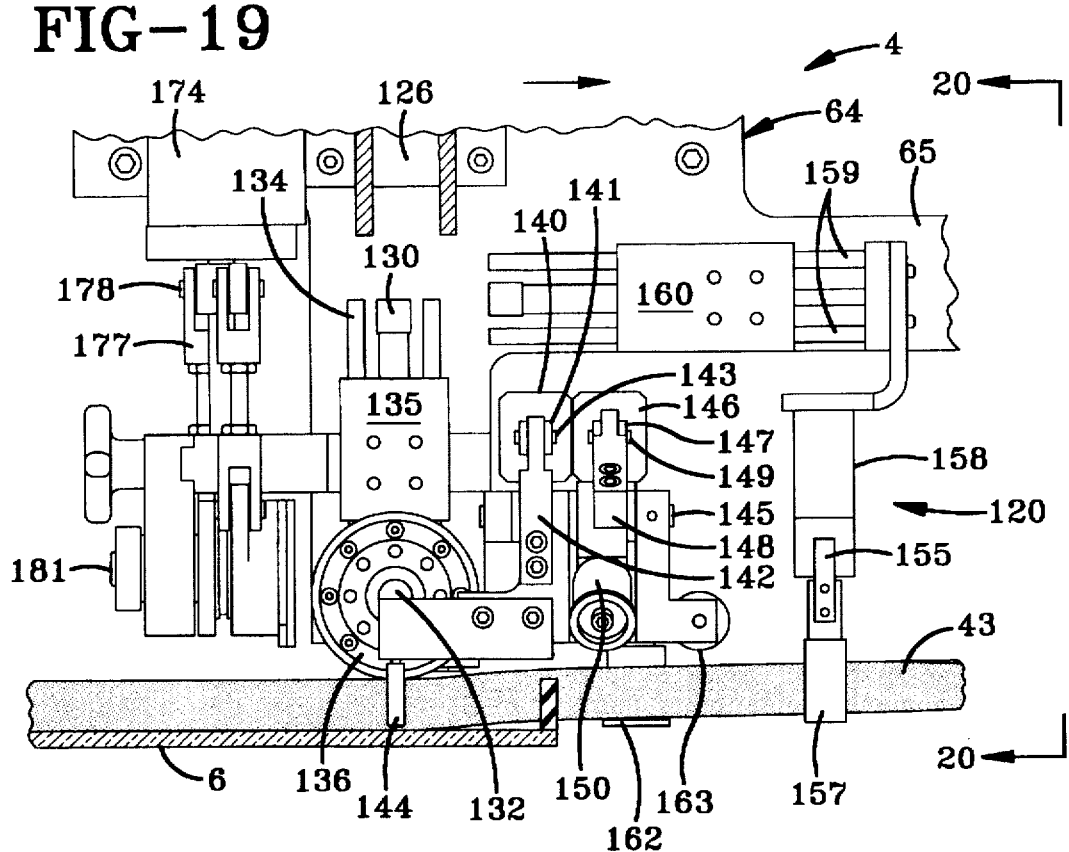
FIG. 19 is an enlarged side elevational view similar to FIG. 13 shown in a seventh position.
Figure 20:
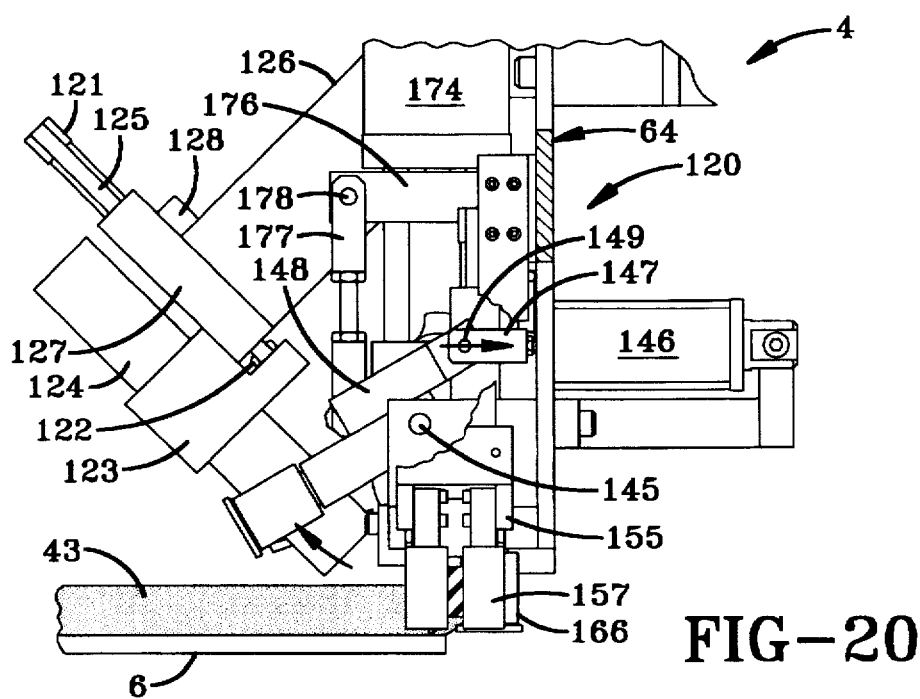
FIG. 20 is an enlarged view of the applicator head in the position shown in FIG. 21 looking in the direction of line 20—20, FIG. 19.

Having now described the path of travel of flexible tape 43 through flexible tape applicator 1, the method of operation will be described with specific reference to FIGS. 1 and 13–25. Referring first to FIG. 1, first motor 9, second motor 18 and third motor 23 of robotic arm 2 are operated to move mounting pad 3 into the starting position relative to planar sheet 6 supported on support table 5. Thereafter, drive shafts 24 may be rotated to rotate wrist portion 25 in the direction of arrow D, and mounting pad 3 in the direction of arrow E to correctly orient applicator head 4 relative to planar sheet 6. Applicator head 4 is thus in the position shown specifically in FIG. 12 where flexible tape 43 is positioned intermediate pincher pin roller 144 and first stationary roller 165 and below pressure roller 136. Robotic arm 2 is then activated to move applicator head 4 in the position indicated by arrow F (FIG. 14) where second cylinder 130 applies constant pressure on pressure roller 136 to secure the end of flexible tape 43 to planar sheet 6. However, flexible tape 43 contacts planar sheet 6 only in application zone 167 as flanges 162 hold flexible tape 43 above planar sheet 6 to assure that the same is not inaccurately positioned thereon. Applicator head 4 is then moved in the direction of arrow G shown specifically in FIG. 14 until pincher pin roller 144 reaches the edge of planar sheet 6. Upon reaching this position, robotic arm 2 is activated to rotate applicator head 4 in the direction of arrow H shown specifically in FIG. 15. This process is repeated at each corner of planar sheet 6 until the applicator head returns to the corner of planar sheet 6 where continuous flexible tape 43 was initially positioned onto planar sheet 6.

The forward motion of applicator head 4 is stopped just prior to pincher rollers 157 contacting the existing flexible tape 43 positioned on planar sheet 6. Fifth pneumatic cylinder 153 is then activated to displace cylinder rod 154 downwardly, causing mounting blocks 155 and interconnected pincher rollers 157 to rotate about stabilizer block 158 and into a substantially horizontal position shown specifically in FIGS. 18 and 19. Pincher rollers 157 thus rotate in the direction indicated generally at I in FIG. 18. Upon activating fifth pneumatic cylinder 153 to raise pincher rollers 157 to the position shown in FIGS. 17 and 18, robotic arm 2 is activated to move applicator head 4 in the direction of arrow J shown speciifcally in FIG. 17 until pincher roller 150 is positioned adjacent the beginning of flexible tape 43. Thereafter, fourth pneumatic cylinder 146 is activated to retract cylinder rod 147 and cause mounting block 148 and interconnected pincher roller 150 to rotate about cylindrical rod 145 causing the same to move to an angled orientation just above flexible tape 43 as shown specifically in FIGS. 20 and 21.

Figure 21:
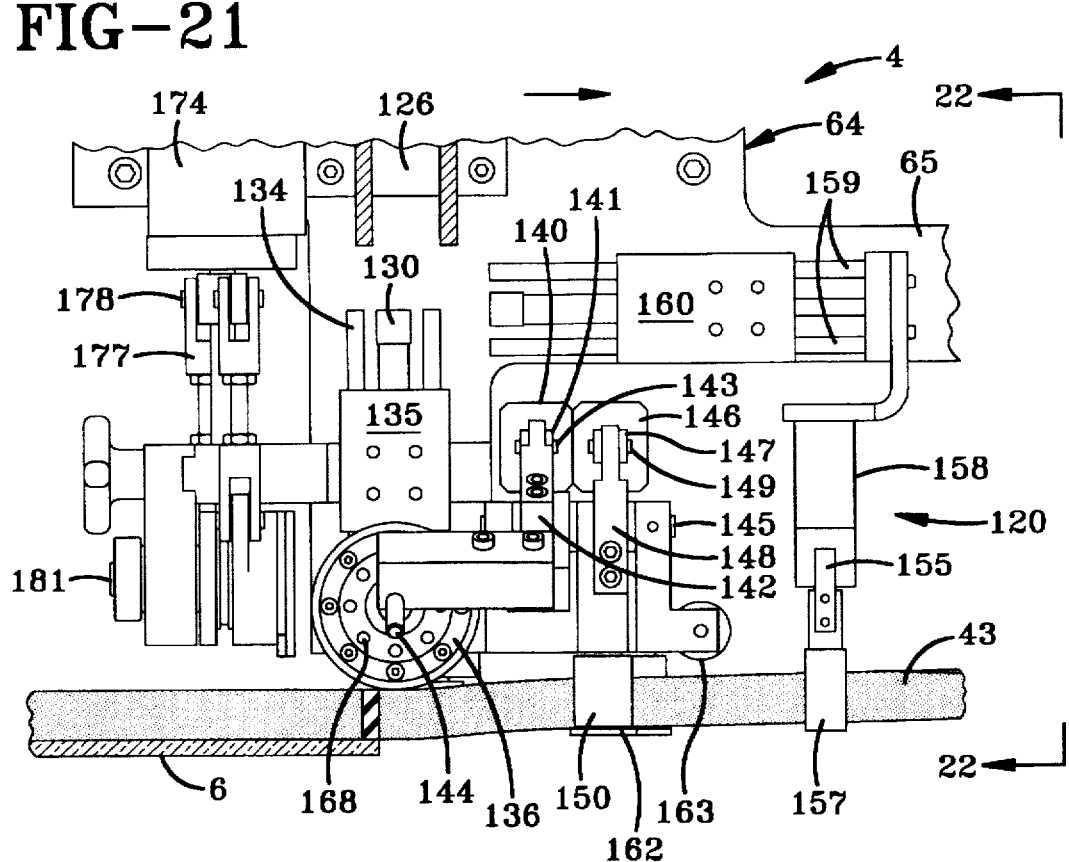
FIG. 21 is an enlarged side elevational view similar to FIG. 13 shown in a eighth position.
Figure 22:
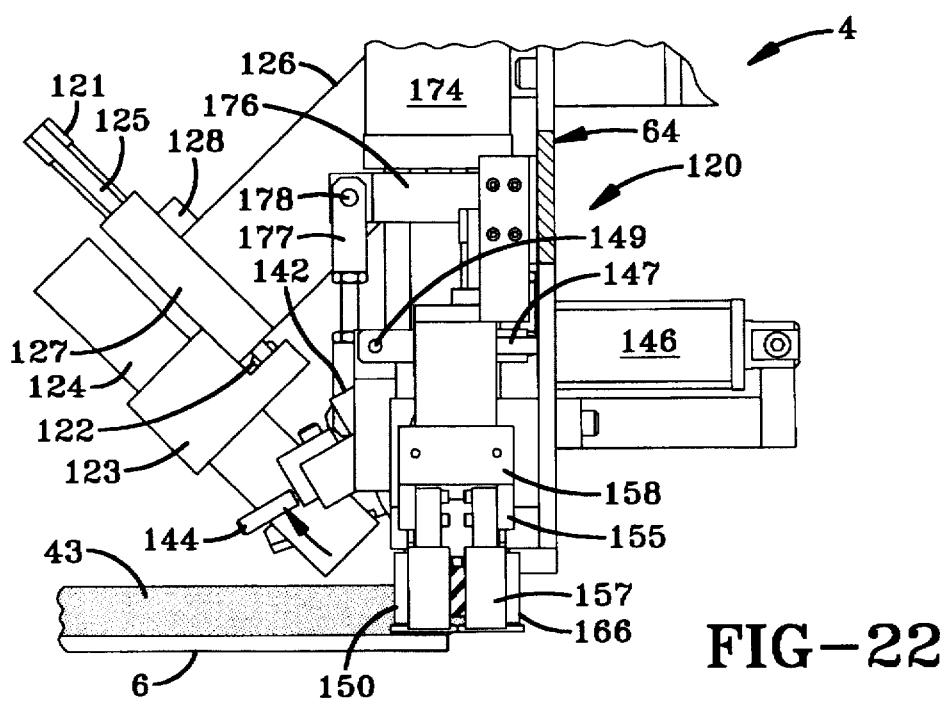
FIG. 22 is an enlarged view of the applicator head in the position shown in FIG. 23 looking in the direction of line 22—22, FIG. 21.

Thereafter, upon pincher pin roller 144 being moved to a position via activation of robotic arm 2 adjacent the beginning of continuous flexible tape 43, third pneumatic cylinder 140 is activated to push cylinder rod 141 further into pneumatic cylinder 140 thereby causing mounting block 142 and interconnected pincher pin roller 144 to rotate about cylinder rod 145 thereby causing pincher pin roller 144 to rotate upwardly to an angular orientation relative to flexible tape 43 (FIGS. 21 and 22). Robotic arm 2 is once again commanded to move applicator head 4 to a position where scissors blades 179 are positioned just beyond planar sheet 6. Once in this position, hydraulic cylinder 174 is actuated thereby moving cylinder rod 175 and interconnected mounting block 176. Movement of mounting block 176 causes scissors blades 179 to rotate about pivot pin 181. Such pivotal movement causes cutting edges 182 to interact and cut flexible tape 43.

After hydraulic cylinder 174 is actuated causing scissors blades 179 to rotate about pivot pin 191 to cut flexible tape 43, pneumatic cylinder 8 is activated to move pincher rollers 157 from the retracted to the expanded position. Inasmuch as pincher rollers 157 grip flexible tape 43, the end of flexible tape 43 is moved to a starting position within application zone 167 intermediate stabilizer roller 165 and pincher pin roller 144 beneath pressure roller 136. Flexible tape 43 is thus positioned for application on the next planar sheet.

Throughout the operation of flexible tape applicator 1, third optical sensor 169 continuously projects a beam at pressure roller 136. Inasmuch as pressure roller 136 frictionally engages flexible tape 43, it rotates as a result of the movement of applicator head 4 relative to planar sheet 6. Such rotation causes third optical sensor 169 to receive an intermittent beam from the light source as the light beam alternatively passes through holes 168 and is blocked by pressure roller 136 intermediate holes 168. However, should third optical sensor 169 receive a continuous light signal or a continuous reflected signal, third optical sensor 169 would forward a signal to robotic arm 2 to cease operation. The signal to cease operation will occur when flexible tape 43 does not initially adhere to planar sheet 6 such that operation of flexible tape applicator 1 does not result in the application of flexible tape 43 to planar sheet 6. Once flexible tape applicator 1 has been stopped, the machine may be reviewed with a minimum of down time.

Also during the operation of flexible tape applicator 1, followers 58 continuously move along slide rods 54 and 56. Specifically, as flexible tape 43 passes through each follower 58, an angular pressure is provided to followers 58 by flexible tape 43. Followers 58 thus assure that the use of a spool having successively wound revolutions of flexible tape 43 will not unduly influence the path of travel of flexible tape 43 through flexible tape applicator 1. Additionally, inasmuch as coil springs 57 are positioned adjacent each end of slide rods 54 and 56, the path of travel of followers 58 relative to slide rods 54 and 56 is predetermined to that length of slide rods 54 and 56 positioned intermediate coil springs 57.

Throughout the application of flexible tape 43 to planar sheet 6, printer 124 may print predetermined spaced marks along the interior of flexible tape 43. These marks, one of which is shown particularly in FIG. 24 and is indicated generally at 192, indicates the point at which a muntin would be placed for the manufacturing of a divided light window. While marks 192 may be applied by merely activating printer 124 at equal intervals of flexible tape 43 which pass through applicator head 4, such methods of application may create unequal marking. Specifically, inasmuch as a length of flexible tape 43 is utilized to create each corner, that amount of flexible tape 43 will offset equally spaced marks 192 such that the marks following each corner will be offset by an amount equal to the amount of flexible tape 43 utilized to create the corner. As such, printer 124 does not index off the amount of flexible tape passing through applicator head 4, but rather, receives index information from robotic arm 2 such that printer 124 is instructed to print a mark 192 at predetermined distances of travel of applicator head 4 along planar sheet 6. In this manner, marks 192 formed on flexible tape 43 will be accurately positioned on all four sides of planar sheet 6 in order to assure that muntins positioned thereon are accurately spaced. Printer 124 receives information related to the preselected distances traveled by applicator head 4 from robotic arm 2 and activates at preselected intervals along the path of travel. A variety of other information may also be applied to flexible tape 43 such as manufacturer and customer information without departing from the spirit of the present invention.

Control unit 94 controls the speed of drive motor 47. Control unit 94 receives input data from three sources. The speed of drive motor 47 is thus initially set to relate to the vector velocity of robotic arm 2 such that the amount of flexible tape unwound from operation of drive motor 47 initially matches the amount of flexible tape required if applicator head 4 is moving at a vector velocity similar to that of robotic arm 2. Sensors 90 and 92 thus provide multiplying input data and sensor 115 provides trimming input data from dancer arm assembly 95. Specifically, drive motor 47 receives continuous input from sensors 90 and 92 to determine what layer of flexible tape 43 is being removed from spool 42. Inasmuch as flexible tape 43 is laid onto spool 42 in contiguous wraps axially along spool 42 and concentrically around the axis of spool 42, each optical sensor 90 and 92 measures the distance between the edge wrap and the sensor to determine which concentric layer of flexible tape 43 is being removed from spool 42. Referring specifically to FIGS. 4 and 6, sensor 92 measures the distance between the flexible tape and the sensor and compares that distance to the distance measured from sensor 90 to spool 42. The distance measured by sensor 92 would indicate that the current layer of flexible tape 43 has been removed from beneath sensor 92 as the distance is greater under sensor 92 than under sensor 90. Once the tape has been removed from below sensor 90, the distance from sensor 90 would be utilized to indicate which layer of flexible tape 43 is being removed from spool 42. Knowing which layer of flexible tape 43 is being removed from spool 42 allows the speed of drive motor 47 to be multiplied from the initial speed set by control unit 94 to relate to the vector velocity of robotic arm 2. Specifically, as each layer of flexible tape 43 is removed from spool 42, the circumference of the spool also decreases. As the circumference of each wrap of flexible tape 43 decreases, the amount of tape removed during any single revolution of spool 42 also decreases. The speed of drive motor 47 must then be increased to rotate more often to remove a given length of flexible tape each time an additional wrap of tape is removed from spool 42. Sensors 90 and 92 thus provide information as to the particular level of flexible tape 43 being removed so that the speed of drive motor 47 may be adjusted accordingly.

Alternatively, drive motor 47 should be slowed when less flexible tape is required. Specifically, when applicator head 4 is negotiating a corner, very little flexible tape 43 is utilized, but a significant amount of time passes during corner formation relative to straight line operation.

Dancer arm assembly 95 creates a pressure input read by sensor 115 which pressure input may be used to trim the speed of drive motor 47. Specifically, as flexible tape 43 is fed out from spool 42 over dancer roller 105, it is done so under tension. A change in the tension in flexible tape 43 will change the pressure on cylinder rod 112 causing the same to move within pneumatic cylinder 110. Sensor 115 determines the amount of deflection of dancer roller 105 as a result of the tension in flexible tape 43. Sensor 115 forwards this information to control unit 94 which may increase the speed of drive motor 47 to increase the amount of flexible tape 144 delivered by drive motor 47 in a situation where the dancer arm assembly 95 is in the position shown in dot-dash lines in FIG. 7, i.e., when the pressure from flexible tape 43 is great as applicator assembly 120 is requiring more flexible tape 43 than drive motor 47 is currently unwinding from spool 42. Alternatively, dancer arm assembly 95 may create a signal read by a sensor 115 indicating that drive motor 47 is feeding out too much flexible tape and that applicator assembly 120 is not utilizing the amount of flexible tape being currently unwound from spool 42. Such input will trim the speed of motor 47 until the speed of drive motor 47 matches the lineal speed of robotic arm 2.

In summary, a flexible tape applicator 1 includes a robotic arm 2 supporting an applicator head 4 suspended over a support table 5. Applicator head 4 is formed with a cradle 33 for receiving a spool 42 of flexible tape. A drive motor 47 is provided to rotate spool 42 and the flexible tape passes over a dancer arm assembly 95 connected to a pneumatic cylinder 110. Either the pressure on the pneumatic cylinder or the position of the cylinder rod relative to the cylinder is measured to form an analog signal which relates to the amount of pressure exerted by the flexible tape onto dancer arm assembly 95. The signal is forwarded from a sensor 115 to drive motor 47 such that as the pressure increases on dancer arm assembly 95, the speed of drive motor 47 increases. Conversely, if the pressure on dancer arm assembly 95 decreases, the speed of drive motor 47 decreases. The pressure exerted on dancer arm assembly 95 is thus proportionally related to the amount of flexible tape 43 being applied onto planar sheet 6. A plurality of optical sensors are provided to measure the layer of flexible material 43 currently being removed from spool 42.

Upon application of a continuous flexible tape to a planar sheet, a plurality of pneumatic cylinders are operated to move the rollers out of the way to assure that the applicator head does not inadvertently disassociate flexible tape 43 from planar sheet 27.

Accordingly, the improved flexible tape applicator is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved flexible tape applicator is constructed and used, the characteristics of the construction, and the advantageous, new and useful results obtained; the new and useful structures, devices, elements, arrangements, parts and combinations, are set forth in the appended claims.

We claim:

1. An applicator for applying a flexible tape to a sheet comprising:

an applicator head having a path of travel, a flexible tape path extending at least partially through the applicator head, and an application zone;

a table adapted to retains the sheet adjacent the applicator head;

first drive means for moving the applicator head relative to the sheet along the path of travel at preselected speeds;

data collection means for collecting data related to the speed of the first drive means;

second drive means for driving the flexible tape; and a control means operatively connected to the second drive means for receiving data from the data collection means and for altering the speed of the speed drive means in response to said collected data and for maintaining a proportional relationship between the speed of operation of the second drive means and the speed of operation of the first drive means whereby the tension on the flexible tape remains substantially constant throughout the path of travel of the applicator head.

2. An applicator as defined in claim 1 in which the table is substantially horizontal.

3. An applicator as defined in claim 1 in which the first drive means is a robotic arm; in which the applicator head is carried by the robotic arm; in which the robotic arm includes means for moving the applicator head in a plane parallel to the table, and in which the applicator head includes means for moving the applicator head in a direction perpendicular to the table.

4. An applicator as defined in claim 3 in which the robotic arm is a 6-axis robotic arm.

5. An applicator as defined in claim 3 in which second drive means includes a drive motor adapted for feeding flexible tape to the applicator head along the flexible tape path.

6. An applicator as defined in claim 5 in which the applicator head includes a cradle adapted for supporting a spool of flexible tape; in which the drive motor is carried by the applicator head adjacent the spool.

7. An applicator as defined in claim 6 in which an axle is adapted to support the spool; and in which the drive motor is operatively connected to the axle for rotating the spool.

8. An applicator as defined in claim 7 in which the data collection means includes first sensor means positioned adjacent the spool for determining the layer of flexible tape being removed from the spool whereby the control unit receives information from the first sensor means and increases the speed of the motor as each successive layer of flexible tape is removed from the spool.

9. An applicator as defined in claim 8 in which the first sensor means is a pair of optical sensors positioned above the spool for projecting a optical beam at the spool for measuring the distance from said sensor to the layer of flexible tape.

10. An applicator as defined in claim 8 in which the data collection means includes a dancer arm adapted to contact the flexible tape and deflect in response to tension on the flexible tape and second sensor means for measuring the deflection of the dancer arm; in which the control means operatively communicates with the second sensor means to receive data relating to the dancer arm deflection whereby deflection of the dancer arm in one direction causes the control means to increase the speed of operation of the second drive means, and deflection of the dancer arm in another direction causes the control means to decrease the speed of operation of the second drive means.

11. An applicator as defined in claim 1 in which the data collection means includes a dancer arm adapted to contact the flexible tape and deflect in response to tension on the flexible tape and second sensor means for measuring the deflection of the dancer arm; in which the control means operatively communicates with the second sensor means to receive data relating to the dancer arm deflection whereby deflection of the dancer arm in one direction causes the control means to increase the speed of operation of the second drive means, and deflection of the dancer arm in another direction causes the control means to decrease the speed of operation of the second drive means.

12. An applicator as defined in claim 11 in which the dancer arm is carried on the applicator head along the flexible tape path.

13. An applicator as defined in claim 12 in which the second sensor means includes a cylinder and a piston; in which one of the cylinder and piston is attached to the dancer arm whereby deflection of the dancer arm causes said one of the piston and cylinder to move relative to the other of the piston and cylinder to alter the pressure within the cylinder; and in which the second sensor means further includes pressure measuring means for measuring the pressure in the cylinder to determine the amount of defection of the dancer arm.

14. An applicator as defined in claim 13 in which the second sensor means includes a cylinder and a piston; in which one of the cylinder and piston is attached to the dancer arm whereby deflection of the dancer arm causes said one of the piston and cylinder to move relative to the other of the piston and cylinder; and in which the second sensor means further includes measuring means for measuring the actual distance traveled by the piston in the cylinder to determine the amount of defection of the dancer arm.

15. An applicator as defined in claim 8 in which the applicator head includes a plurality of pincher rollers adjacent the application zone, and in which the dancer arm is positioned intermediate the drive motor and the plurality of pincher rollers along the flexible tape path.

16. An applicator as defined in claim 15 in which at least one of the rollers is attached to a retraction means for retracting the roller over the flexible tape.

17. An applicator as defined in claim 16 in which the retraction means is a cylinder; and in which the cylinder operates to retract a roller over the flexible tape.

18. An applicator as defined in claim 17 in which at least one stationary roller is positioned adjacent to and spaced apart from each pincher roller, and in which the flexible tape is positioned intermediate the stationary roller and the pincher roller along the flexible tape path.

19. An applicator as defined in claim 18 in which a pressure roller means is positioned intermediate the pincher and the stationary roller for applying a downward force on the flexible tape.

20. An applicator as defined in claim 19 in which a pressure means is provided for supplying a downward force onto the pressure roller.

21. An applicator as defined in claim 20 in which the pressure means is a fluid cylinder attached to the pressure roller.

22. An applicator as defined in claim 19 in which a sensor means is positioned adjacent the pressure roller to determine if the pressure roller is rotating.

23. An applicator as defined in claim 19 in which the sensor means is an optical sensor positioned adjacent the pressure roller; in which at least one hole is formed through the roller whereby the optical sensor directs a beam at the roller to determine if it is rotating by determining if the holes are passing by the optical sensor.

24. An applicator as defined in claim 1 in which a printer means is carried by the applicator head for applying at least one muntin mark onto the flexible tape.

25. An applicator as defined in claim 24 in which the printer means is carried by the applicator head behind the plurality of rollers whereby the printer prints the flexible tape after it has passed through the rollers.

26. An applicator as defined in claim 25 in which the printer is adapted to print on the flexible tape when the flexible tape is positioned on the planer sheet.

27. An applicator as defined in claim 26 further comprising control means for determining the distance traveled by the applicator head relative to the table, and for activating the printer at predetermined distances of travel of the applicator head relative to the table.

28. An applicator as defined in claim 27 further comprising second data collection means electronically connected to the robotic arm for receiving position information from the robotic arm; in which the control means is electronically connected to the second data collection means whereby the control means controls the printer in response to said position information received from the second data collection means.

29. An applicator as defined in claim 27 in which retraction means are attached to the printer to move the printer toward and away from the sheet.

30. An applicator as defined in claim 11 in which the flexible tape path has a length; and in which the length is constant from the dancer arm to the application zone.

31. A method of applying a flexible tape to a sheet comprising the steps of:
    moving an applicator head having a flexible tape path along a predetermined path while simultaneously applying flexible tape to the sheet at predetermined speeds;
    measuring the tension on the flexible tape along the flexible tape path and creating a tension signal;
    forwarding the tension signal to a control unit;
    providing a flexible tape drive means for driving the flexible tape to the applicator head while applying the flexible tape to the sheet; and
    controlling the speed of the flexible tape drive means with the control unit in response to said tension signal for maintaining a proportional relationship between the speed of operation of the flexible tape drive means and the predetermined speeds whereby the tension on the flexible tape remains substantially constant throughout the path of travel of the applicator head.

32. The method as defined in claim 31 including the further step of determining the tension on the flexible tape by passing the flexible tape over a dancer arm; determining the deflection of the dancer arm; and changing the rate of rotation of the drive means in direct relation to the amount of deflection of the dancer arm.

33. The method as defined in claim 32 including the further steps of providing a motor as the drive means for rotating a spool of flexible tape; and increasing the speed of the motor rotating the spool as the measured deflection increases, and decreasing the rate of rotation of the motor driving the spool as the measured deflection decreases.

34. The method as defined in claim 31 including the further step of providing a spool having a plurality of concentric layers of flexible material; determining which layer of flexible material is being removed while the applicator head moves along a path of travel; increasing the speed of the drive means as subsequent layers of flexible tape are removed from the spool.

35. The method as defined in claim 31 including the further step of printing muntin marks on to the flexible tape after the flexible tape is positioned on the sheet.

36. The method as defined in claim 35 including the further step of determining the distance traveled by the applicator head relative to the sheet; and activating the printer at preselected distances along the path of travel of the applicator head relative to the sheet for printing muntin marks.

37. The method as defined in claim 32 comprising the further steps of providing a number of rollers adjacent the application zone; and retracting at least one of said rollers to allow the same to pass over the flexible tape.

* * * * *